United States Patent
Nakanishi et al.

(10) Patent No.: US 10,183,632 B2
(45) Date of Patent: Jan. 22, 2019

(54) WORK VEHICLE PERIPHERY MONITORING SYSTEM AND WORK VEHICLE

(71) Applicant: Komatsu Ltd., Tokyo (JP)

(72) Inventors: Yukihiro Nakanishi, Hiratsuka (JP); Shinji Mitsuta, Hiratsuka (JP); Takeshi Kurihara, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/993,121

(22) PCT Filed: Nov. 29, 2012

(86) PCT No.: PCT/JP2012/080965
§ 371 (c)(1),
(2) Date: Jun. 11, 2013

(87) PCT Pub. No.: WO2014/045465
PCT Pub. Date: Mar. 27, 2014

(65) Prior Publication Data
US 2014/0347483 A1 Nov. 27, 2014

(30) Foreign Application Priority Data
Sep. 21, 2012 (JP) .................. 2012-208553

(51) Int. Cl.
*B60R 11/04* (2006.01)
*G08G 1/16* (2006.01)
*B60P 1/04* (2006.01)

(52) U.S. Cl.
CPC .............. *B60R 11/04* (2013.01); *B60P 1/045* (2013.01); *G08G 1/165* (2013.01); *B60R 2300/105* (2013.01)

(58) Field of Classification Search
CPC .. G08G 1/16; B60R 2300/806; B62D 15/027; B60Q 9/007
(Continued)

(56) References Cited

U.S. PATENT DOCUMENTS 6,065,922 A * 5/2000 Kato ................... B65G 69/186
141/263
6,081,223 A * 6/2000 Kitahara ............... G01S 13/931
340/436

(Continued)

FOREIGN PATENT DOCUMENTS

JP      08-122062 A     5/1996
JP      2004-251024 A   9/2004

(Continued)

OTHER PUBLICATIONS

International Search Report dated Feb. 12, 2013, issued for PCT/JP2012/080965.

*Primary Examiner* — Deirdre L Beasley
(74) *Attorney, Agent, or Firm* — Locke Lord LLP

(57) ABSTRACT

A work vehicle periphery monitoring system which monitors a periphery of a work vehicle with a vessel for loading a load thereon, the work vehicle periphery monitoring system includes: a plurality of object detecting devices each of which is attached to the work vehicle and detects an object existing around the work vehicle; and a controller which notifies an alarm based on a detection result of the object detecting device and switches between a notification mode for notifying the alarm and a restriction mode for restricting the notification of the alarm based on a state of the work vehicle.

12 Claims, 16 Drawing Sheets

(58) Field of Classification Search
USPC .................... 348/148; 340/933; 414/809
See application file for complete search history.

(56) References Cited

U.S. PATENT DOCUMENTS

| | | | | | |
|---|---|---|---|---|---|
| 6,097,311 | A | * | 8/2000 | Iwasaki | B60Q 9/008 180/169 |
| 6,173,233 | B1 | * | 1/2001 | Janutka | G01S 7/523 340/436 |
| 6,175,788 | B1 | * | 1/2001 | Hasegawa | B60G 17/0185 701/33.9 |
| 6,247,538 | B1 | * | 6/2001 | Takeda | E02F 3/842 172/2 |
| 2002/0041239 | A1 | * | 4/2002 | Shimizu | B60R 1/00 340/932.2 |
| 2003/0160685 | A1 | * | 8/2003 | Su | B60R 1/00 340/425.5 |
| 2003/0216817 | A1 | * | 11/2003 | Pudney | E05B 81/78 700/17 |
| 2004/0017285 | A1 | * | 1/2004 | Zielinski | B60D 1/36 340/431 |
| 2004/0095227 | A1 | * | 5/2004 | Lehman | B60R 25/102 340/425.5 |
| 2005/0073433 | A1 | * | 4/2005 | Gunderson | B60Q 9/006 340/903 |
| 2005/0128060 | A1 | * | 6/2005 | Rennick | G01S 15/931 340/435 |
| 2005/0134482 | A1 | * | 6/2005 | Li | B60Q 1/48 340/932.2 |
| 2006/0099067 | A1 | * | 5/2006 | Wigerud | B60R 1/00 414/809 |
| 2006/0287800 | A1 | * | 12/2006 | Watanabe | B62D 15/0275 701/96 |
| 2007/0103282 | A1 | * | 5/2007 | Caird | B60Q 9/00 340/435 |
| 2007/0116118 | A1 | * | 5/2007 | Kostrzewski | H04L 1/0009 375/240.12 |
| 2007/0132563 | A1 | * | 6/2007 | Balbale | B60Q 9/004 340/435 |
| 2008/0048886 | A1 | * | 2/2008 | Brown | G08G 1/0175 340/937 |
| 2008/0136589 | A1 | * | 6/2008 | Baird | G08B 15/001 340/5.64 |
| 2008/0183344 | A1 | * | 7/2008 | Doyen | G08B 3/10 701/9 |
| 2008/0238636 | A1 | * | 10/2008 | Birging | B60R 25/1004 340/426.1 |
| 2009/0018721 | A1 | * | 1/2009 | Mian | G01M 17/013 701/31.4 |
| 2009/0079839 | A1 | * | 3/2009 | Fischer | G01S 7/003 348/218.1 |
| 2009/0216410 | A1 | * | 8/2009 | Allen | G05D 1/0238 701/50 |
| 2009/0303035 | A1 | * | 12/2009 | Kirtley, Jr. | B66F 9/0755 340/539.11 |
| 2010/0141419 | A1 | * | 6/2010 | Coward | B60Q 1/22 340/464 |
| 2010/0238288 | A1 | * | 9/2010 | Klaerner | B60Q 1/0023 348/148 |
| 2010/0289670 | A1 | * | 11/2010 | Boehme | B60Q 9/004 340/932.2 |
| 2010/0321170 | A1 | * | 12/2010 | Cooper | G02B 27/01 340/425.5 |
| 2012/0050022 | A1 | * | 3/2012 | Leisure | B60P 1/00 340/431 |
| 2012/0263560 | A1 | * | 10/2012 | Diekhans | A01D 43/087 414/294 |
| 2012/0271504 | A1 | * | 10/2012 | Reiners | E02F 9/2054 701/29.1 |
| 2013/0103236 | A1 | * | 4/2013 | Mehrgan | B60T 17/22 701/22 |
| 2014/0019042 | A1 | * | 1/2014 | Sugawara | E02F 9/26 701/431 |
| 2014/0027229 | A1 | * | 1/2014 | Tojima | B60L 5/24 191/64 |
| 2014/0074743 | A1 | * | 3/2014 | Rademaker | G06Q 50/28 705/334 |
| 2014/0333424 | A1 | * | 11/2014 | Chang | B60R 25/30 340/426.22 |

FOREIGN PATENT DOCUMENTS

| | | |
|---|---|---|
| JP | 2005-018573 A | 1/2005 |
| JP | 2007-085091 A | 4/2007 |
| JP | 2008-095307 A | 4/2008 |
| JP | 2008-303648 A | 12/2008 |
| JP | 2009-166669 A | 7/2009 |
| JP | 2010-079716 A | 4/2010 |

\* cited by examiner

WORK VEHICLE PERIPHERY MONITORING SYSTEM AND WORK VEHICLE

FIELD

The present invention relates to a technology of monitoring a periphery of a work vehicle.

BACKGROUND

In a civil engineering construction site or a quarry site of a mine, various work vehicles such as a dump truck and an excavator are operated. In such work vehicles, the dump truck includes a vessel for loading a load thereon. Since the vessel stands to discharge the load, the dump truck increases in height when the vessel stands. For example, Patent Literature 1 discloses a technique of operating an alarm lamp and an alarm buzzer when a vessel's dumping state is detected upon operating a gear shifting lever for outputting a gear shifting signal to a running gear shifting device in order to avoid the vessel's contact and the like in a case where a dump truck enters a narrow space while the vessel stands.

CITATION LIST

Patent Literature

Patent Literature 1: Japanese Patent Application Laid-open No. 2009-166669

SUMMARY

Technical Problem

Incidentally, a superjumbo work vehicle is used particularly in a mine. Since such a work vehicle has a vehicle width, a vehicle height, and a longitudinal length which are noticeably larger than those of a general vehicle, it is difficult for an operator to check and recognize a peripheral environment by a side mirror and the like. For this reason, there is proposed a periphery monitoring system which monitors a periphery of a vehicle as a technique for assisting a driving operation by helping an operator to simply recognize a peripheral environment of a vehicle by using an image capturing device or a radar device.

As such a periphery monitoring system, a system is known which detects an object existing around a work vehicle by a radar device and notifies an alarm if necessary. In a case where a work vehicle with the periphery monitoring system is a dump truck, there is a case in which the radar device detects a loading machine when the load is loaded on the vessel. In a case where the loading machine is an excavator, the dump truck moves to a place (a loading station) where the excavator is positioned and stops near the excavator so as to load the load on the vessel. In a case where the loading machine is a wheel loader, the dump truck moves and stops near a predetermined place (a loading station). Then, the wheel loader approaches the dump truck while loading the load on a bucket provided in a working unit thereof and loads the load on the vessel. That is, there is a case in which the radar device detects the loading machine when the dump truck approaches the loading machine or the loading machine approaches the dump truck. Further, for example, in a case where the loading station exists in a place in which a ground surface is excavated, since a wall exists at the side surface of the work vehicle, the radar device may detect the above-described wall. Since the radar device keeps detecting the loading machine or the wall until the loading of the load ends, there is a possibility that the periphery monitoring system may keep notifying the alarm until the loading of the load ends. As a result, there is a possibility that the working machine's operator may feel troublesome.

It is an object of the invention to reduce a possibility of causing an operator to feel troublesome when loading a load onto a vessel in a work vehicle including a periphery monitoring system and a vessel for loading a load thereon

Solution to Problem

According to the present invention, a work vehicle periphery monitoring system which monitors a periphery of a work vehicle with a vessel for loading a load thereon, the work vehicle periphery monitoring system comprises: a plurality of object detecting devices each of which is attached to the work vehicle and detects an object existing around the work vehicle; and a controller which notifies an alarm based on a detection result of the object detecting device and switches between a notification mode for notifying the alarm and a restriction mode for restricting the notification of the alarm based on a state of the work vehicle.

In the present invention, it is preferable that the controller sets the restriction mode when a load is loaded on the vessel.

In the present invention, it is preferable that the controller sets the restriction mode when a brake of the work vehicle is operated.

In the present invention, it is preferable that the controller stops the notification of the alarm using at least a sound in the restriction mode.

In the present invention, it is preferable that the controller displays an alarm image on a display device.

In the present invention, it is preferable that the controller stops an operation of the object detecting device to set the restriction mode.

In the present invention, it is preferable that the controller causes the detection result of the object detecting device not to be input to set the restriction mode.

In the present invention, it is preferable that the controller sets the restriction mode when receiving a loading start signal transmitted from a loading machine which loads the load on the vessel, and wherein the controller sets the notification mode when receiving a loading end signal transmitted from the loading machine.

In the present invention, it is preferable that the work vehicle includes a position detecting device, wherein the controller includes a storage unit which stores position information, and wherein the controller sets the restriction mode when a current position detected by the position detecting device is equal to a position indicated by the position information stored in the storage unit.

In the present invention, it is preferable that the controller switches the restriction mode to the notification mode when a brake of the work vehicle is released in the restriction mode.

In the present invention, it is preferable that a work vehicle periphery monitoring system which monitors a periphery of a work vehicle with a vessel for loading a load thereon, the work vehicle periphery monitoring system comprises: a plurality of object detecting devices each of which is attached to the work vehicle and detects an object existing around the work vehicle; and a controller which notifies an alarm based on a detection result of the object detecting device and switches a notification mode for notifying the alarm to a restriction mode for stopping at least the notification of the alarm using a sound when a load is loaded on the vessel.

According to the present invention, a work vehicle comprises: the work vehicle periphery monitoring system.

According to the invention, it is possible to reduce the possibility of causing the operator to feel troublesome when loading a load onto the vessel in the work vehicle including the periphery monitoring system and the vessel for loading the load thereon.

DESCRIPTION OF EMBODIMENTS

Figure 1:
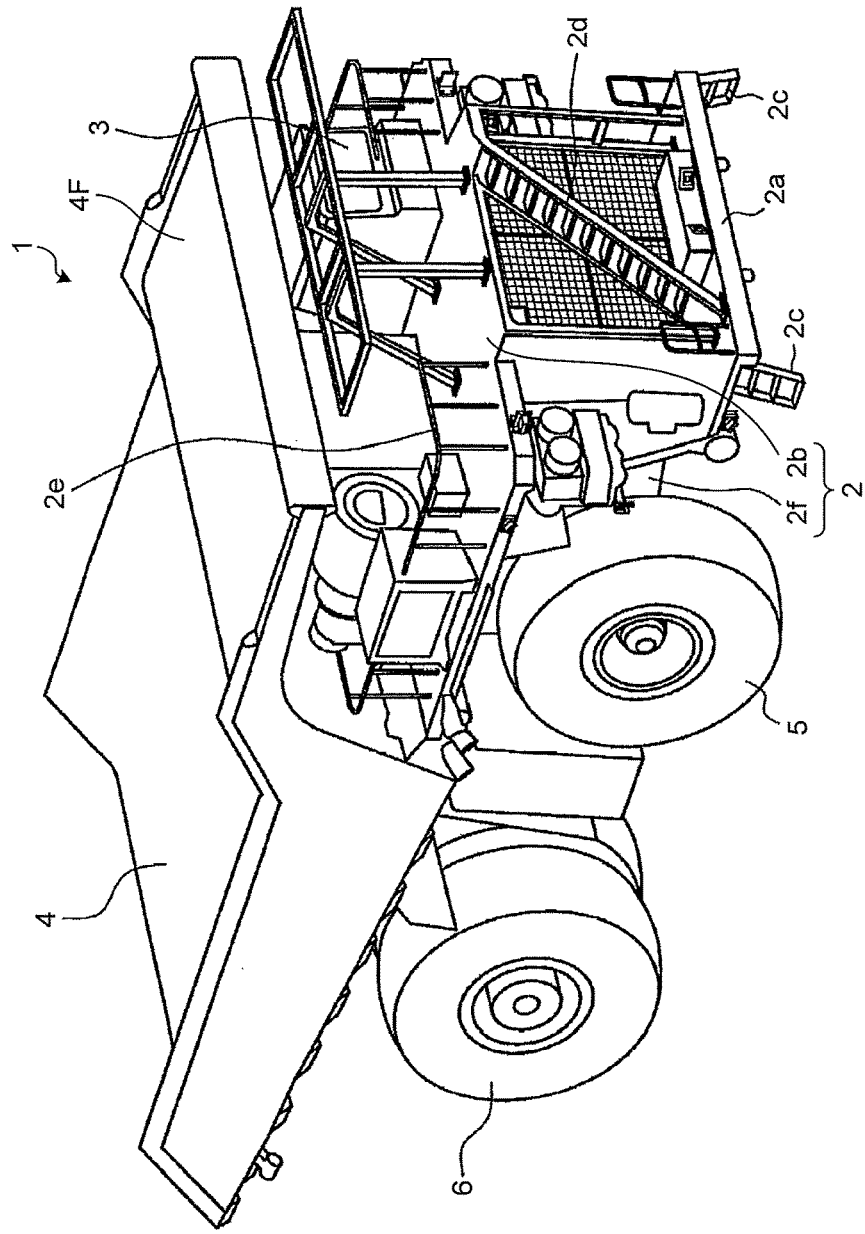
FIG. 1 is a perspective view illustrating a work vehicle according to an embodiment.

A mode for carrying out the invention (embodiment) will be described in detail by referring to the drawings. In the description below, the front side, the rear side, the left side, and the right side are terms based on an operator who sits on a driver seat. For example, the front side indicates the side where the visual line of the operator as the manipulator sitting on the driver seat is directed and the side directed from the driver seat toward a steering wheel operated by the operator. The rear side indicates the opposite side to the front side and the side directed from the steering wheel toward the driver seat. The vehicle width direction of the work vehicle is identical to the left and right direction of the work vehicle.

<Work Vehicle>

Figure 2:
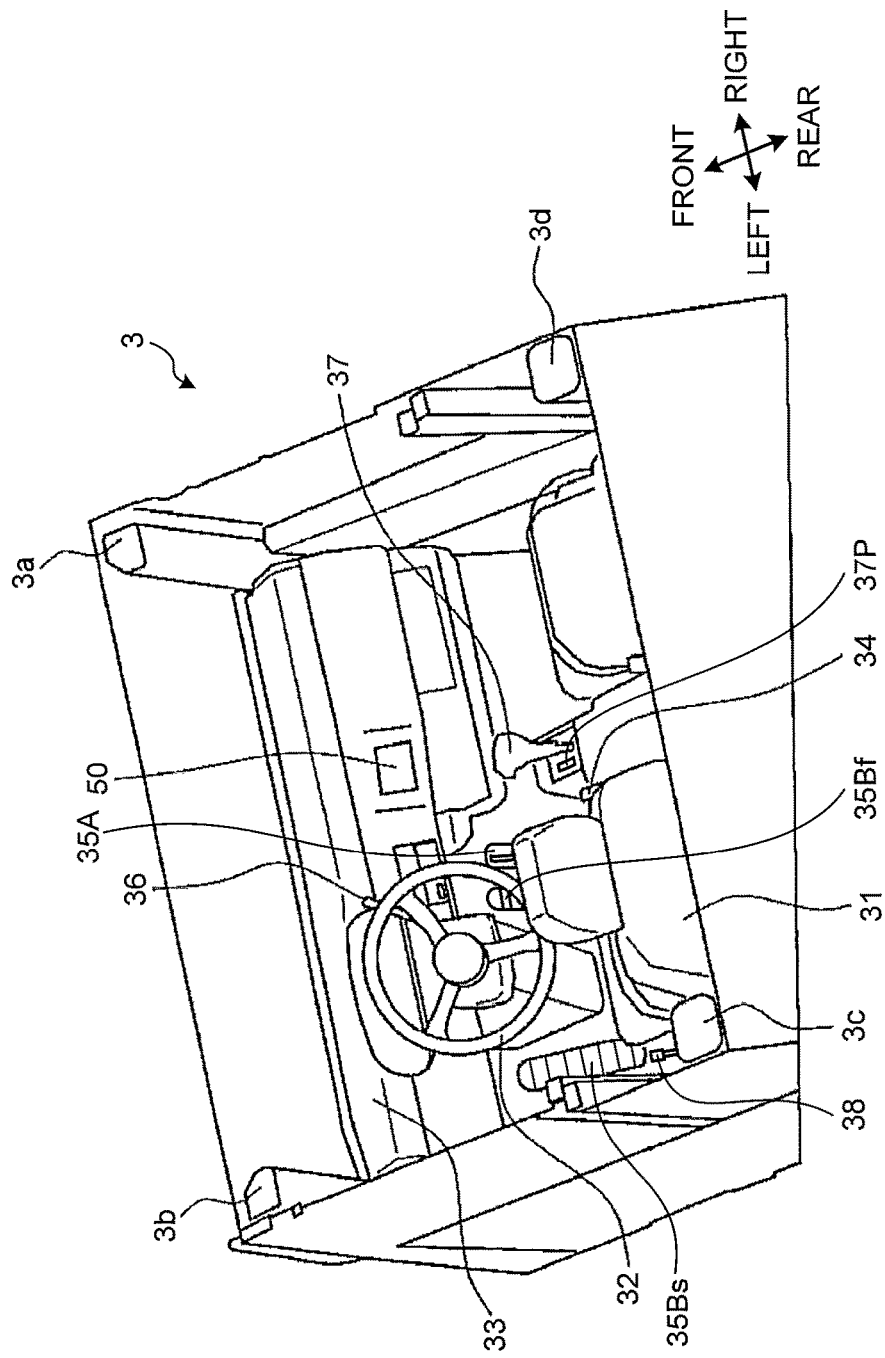
FIG. 2 is a diagram illustrating a structure and an inside of a cab 3 included in the work vehicle according to the embodiment.

FIG. 1 is a perspective view illustrating a work vehicle according to the embodiment. FIG. 2 is a diagram illustrating a structure and an interior of a cab 3 which is included in the work vehicle according to the embodiment. In the embodiment, a self-propelled dump truck (called an off-highway truck) 1 as the work vehicle is a superjumbo vehicle which is used for an operation in a mine. In the embodiment, the work vehicle may not include an upper turning body and a working machine. Further, the type of the dump truck as the work vehicle is not limited.

The dump truck 1 may be of, for example, an articulated type or the like. The dump truck 1 includes a vehicle body portion 2, the cab 3, a vessel 4, a pair of left and right front wheels 5, and a pair of left and right rear wheels 6 of which each pair includes two wheels. The vehicle body portion 2 includes an upper deck 2b and a frame 2f disposed along the front and rear direction. Further, the dump truck 1 includes a periphery monitoring system which monitors the periphery thereof and displays the result. The periphery monitoring system will be described in detail later.

In the embodiment, the dump truck 1 drives an electric motor by the power generated when an internal combustion engine such as a diesel engine drives a generator, so that the rear wheels 6 are driven. In this way, the dump truck 1 is of a so-called electric driving type, but the driving type of the dump truck 1 is not limited thereto. For example, the dump truck 1 may transmit the power of the internal combustion engine to the rear wheels 6 through a transmission so as to drive the rear wheels or may drive an electric motor by the power supplied through a trolley from a line so as to drive the rear wheels 6 by the motor.

The frame 2f supports power generating mechanisms such as the internal combustion engine and the generator and auxiliary machines thereof. The left and right front wheels 5 (only the right front wheel is illustrated in FIG. 1) are supported by the front portion of the frame 2f. The left and right rear wheels 6 (only the right rear wheel is illustrated in FIG. 1) are supported by the rear portion of the frame 2f. Each of the front wheels 5 and the rear wheels 6 has a diameter of about 2 m (meter) to 4 m (meter). As for the rear wheels 6, the inside position of the vessel 4 in the width direction or the outside position of the vessel 4 in the width direction is substantially disposed at the same position as the outside of the rear wheel 6 in the width direction. The frame 2f includes a lower deck 2a and the upper deck 2b. The lower deck 2a is provided near a ground surface and the upper deck 2b is provided above the lower deck 2a. In this way, the dump truck 1 which is used in a mine is formed as a double deck structure with the lower deck 2a and the upper deck 2b.

The lower deck 2a is attached to the lower portion of the front surface of the frame 2f. The upper deck 2b is disposed above the lower deck 2a. A movable ladder 2c which is used to elevate, for example, the cab 3 is disposed below the lower deck 2a. An inclined ladder 2d is disposed between the lower deck 2a and the upper deck 2b so that the operator moves therebetween. Further, a radiator is disposed between the lower deck 2a and the upper deck 2b. A palisade guardrail 2e is disposed on the upper deck 2b. In the embodiment, the ladder 2c and the inclined ladder 2d are set as a part of the upper deck 2b and the lower deck 2a.

As illustrated in FIG. 1, the cab (operating room) 3 is disposed on the upper deck 2b. The cab 3 is disposed on the upper deck 2b so as to be shifted to one side in the vehicle width direction in relation to the center in the vehicle width direction. Specifically, the cab 3 is disposed on the upper deck 2b so as to be positioned at the left side in the vehicle width direction in relation to the center. The arrangement of the cab 3 is not limited to the left side in relation to the center in the vehicle width direction. For example, the cab 3 may be disposed at the right side in the vehicle width direction in relation to the center, and may be disposed at the center in the vehicle width direction. Operation members such as a driver seat, a steering wheel, a shift lever, an accelerator pedal, and a brake pedal are arranged inside the cab 3.

As illustrated in FIG. 2, the cab 3 includes a ROPS (Roll-Over Protection System) with a plurality of (in the embodiment, four) pillars 3a, 3b, 3c, and 3d. The ROPS protects the operator inside the cab 3 if the dump truck 1 rolls over. The driver of the dump truck 1 drives the dump truck in a state where a road shoulder at the left side of the vehicle body portion 2 may be easily checked, but the operator's head needs to be largely moved so as to check the periphery of the vehicle body portion 2. Further, the upper deck 2b is provided with a plurality of side mirrors (not illustrated) which check the periphery of the dump truck 1. Since the side mirrors are arranged at positions away from the cab 3, the driver needs to largely move his/her head even when checking the periphery of the vehicle body portion 2 using the side mirrors.

As illustrated in FIG. 2, the cab 3 includes therein a driver seat 31, a steering wheel 32, a dash cover 33, a wireless device 34, an accelerator pedal 35A, a brake pedal 35Bf, a secondary brake pedal 35Bs, a retarder 36, a shift lever 37, a parking brake operation switch 37P, a dump lever 38, a controller (to be described later in detail) as a monitoring control device which is not illustrated in FIG. 2, a monitor 50, and the like. In FIG. 2, the monitor 50 is assembled in the dash cover 33, but may be installed on the dash cover 33 or may be hung on the ceiling inside the cab 3. That is, the monitor may be installed at any position where the operator may see the monitor 50. Furthermore, the controller not illustrated in FIG. 2 is a part of a periphery monitoring system 10 to be described later. The shift lever 37 is a device which causes the operator of the dump truck 1 to change the advancing direction of the dump truck 1 or the speed gear thereof.

The vessel 4 illustrated in FIG. 1 is a container which loads load such as crushed stones thereon. The rear portion of the bottom surface of the vessel 4 is rotatably connected to the rear portion of the frame 2f through a rotary pin. The vessel 4 may take a loading posture and a standing posture by an actuator such as a hydraulic cylinder. As illustrated in FIG. 1, the loading posture indicates a posture in which the front portion of the vessel 4 is positioned at the upper portion of the cab 3. The standing posture indicates a posture in which the load is discharged and the vessel 4 is inclined rearward and downward. When the front portion of the vessel 4 rotates upward, the vessel 4 changes from the loading posture to the standing posture. The vessel 4 includes a flange portion 4F formed at the front portion thereof. The flange portion 4F is called a protector and extends to the upper side of the cab 3 so as to cover the cab 3. The flange portion 4F which extends to the upper side of the cab 3 protects the cab 3 from the collision with crushed stones and the like.

<Periphery Monitoring System>

Figure 3:
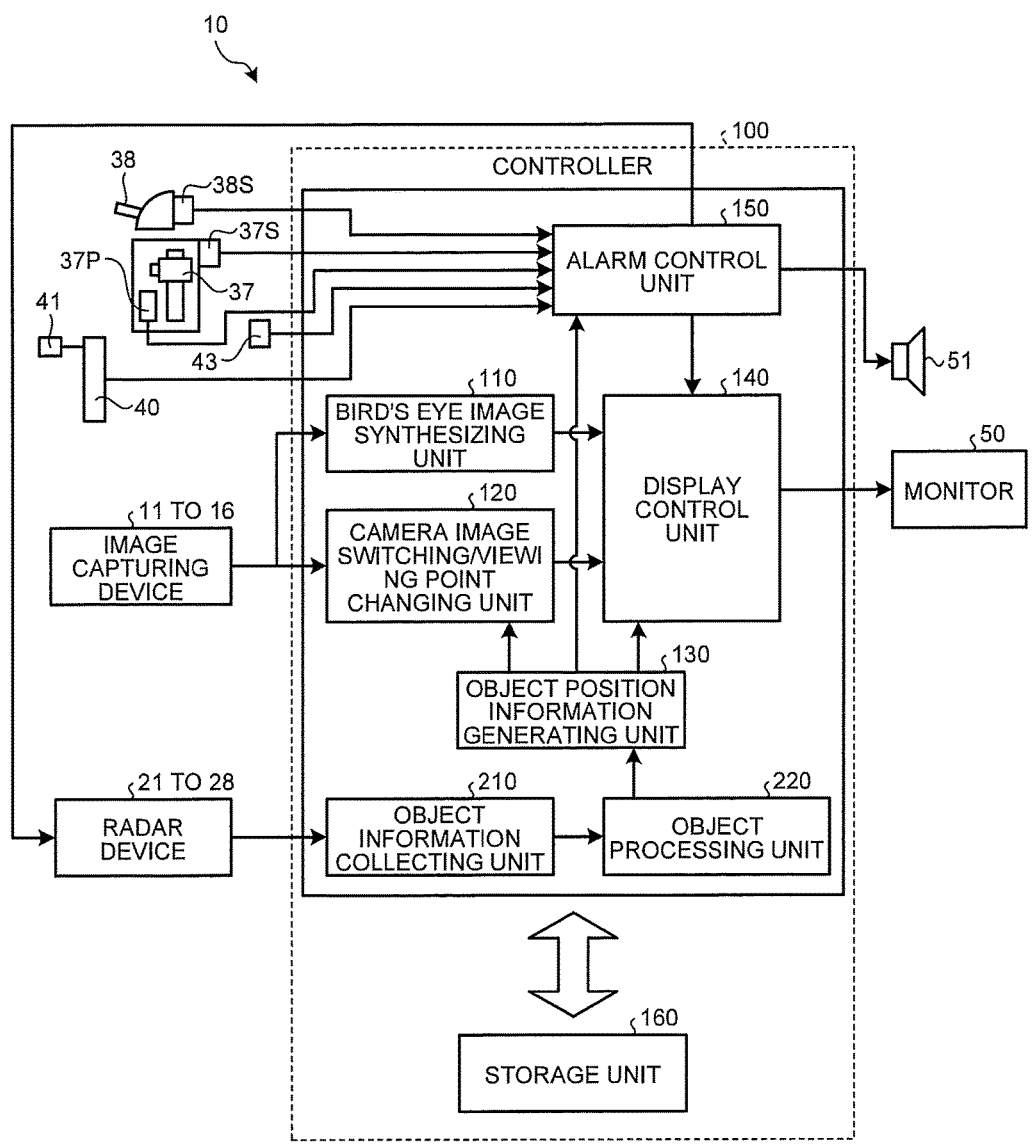
FIG. 3 is a diagram illustrating a periphery monitoring system 10 according to the embodiment.
Figure 4:
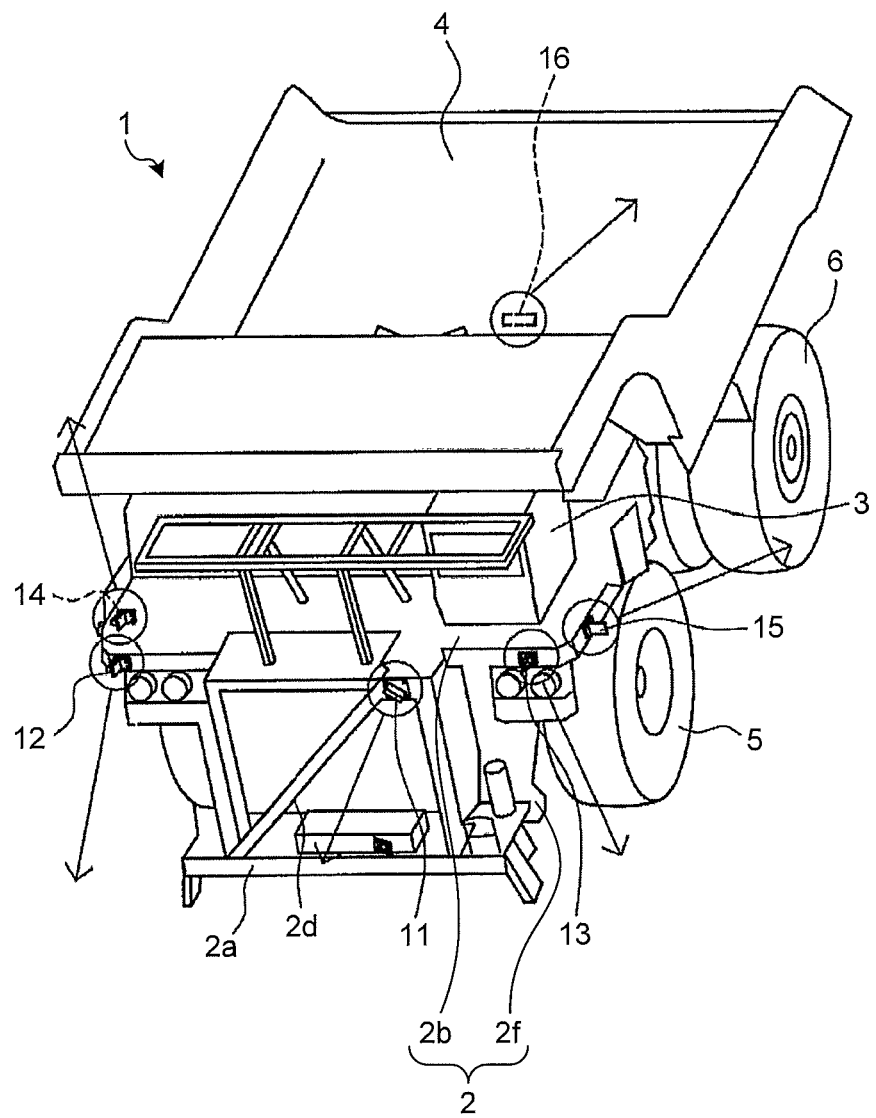
FIG. 4 is a perspective view of a dump truck 1 equipped with image capturing devices 11 to 16 included in the periphery monitoring system 10 according to the embodiment.
Figure 5:
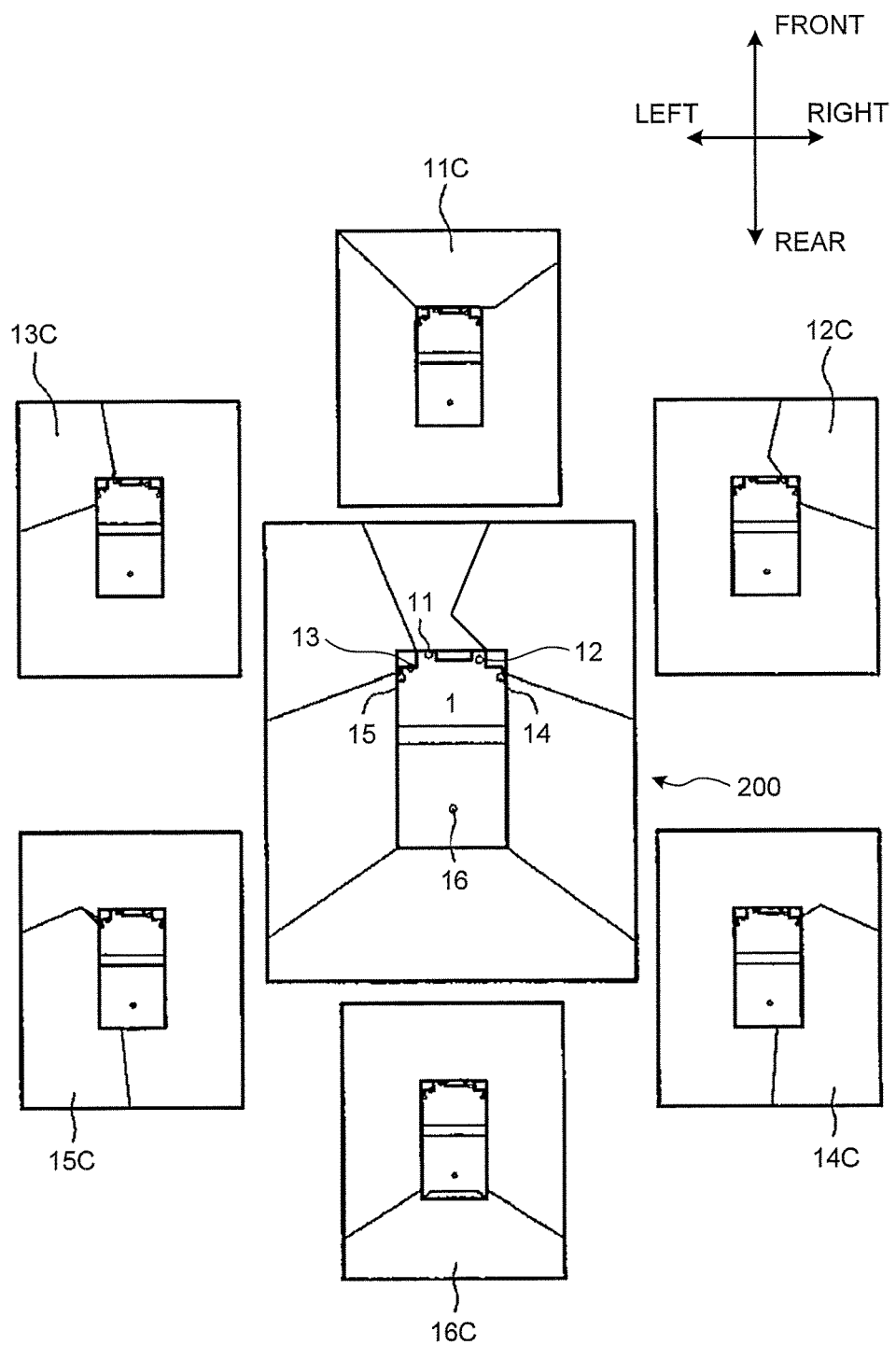
FIG. 5 is a schematic diagram illustrating regions which are captured by a plurality of image capturing devices 11 to 16 and an bird's eye image 200 which is generated based on information of images captured by the plurality of image capturing devices 11 to 16.

FIG. 3 is a diagram illustrating the periphery monitoring system 10 according to the embodiment. FIG. 4 is a perspective view of the dump truck 1 equipped with image capturing devices 11 to 16 which are included in the periphery monitoring system 10 according to the embodiment. FIG. 5 is a schematic diagram illustrating regions which are captured by a plurality of image capturing devices 11 to 16 and an bird's eye image 200 which is generated based on the information of the images captured by the plurality of image capturing devices 11 to 16. The regions which are captured by the plurality of image capturing devices illustrated in FIG. 5 are regions based on the ground surface. As illustrated in FIG. 3, the periphery monitoring system 10 includes a plurality of (in the embodiment, six) image capturing devices 11, 12, 13, 14, 15, and 16, a plurality of (in the embodiment, eight) radar devices 21, 22, 23, 24, 25, 26, 27, and 28, the monitor 50, and a controller 100 as a monitoring control device. Furthermore, in the embodiment, the periphery monitoring system 10 may not be essentially provided with the image capturing devices 11, 12, 13, 14, 15, and 16.

<Image Capturing Device>

The image capturing devices 11, 12, 13, 14, 15, and 16 are attached to the dump truck 1. The image capturing devices 11, 12, 13, 14, 15, and 16 are, for example, a wide dynamic range (WDR) camera. The wide dynamic range camera is a camera that has a function of brightly correcting a dark portion to a level in which a bright portion is visible and adjusting the entire portion so as to be visible.

The image capturing devices 11, 12, 13, 14, 15, and 16 capture the periphery of the dump truck 1 and output the result as image information. In the description below, the image capturing device 11 is appropriately referred to as the first image capturing device 11, the image capturing device 12 is appropriately referred to as the second image capturing device 12, the image capturing device 13 is appropriately referred to as the third image capturing device 13, the image capturing device 14 is appropriately referred to as the fourth image capturing device 14, the image capturing device 15 is appropriately referred to as the fifth image capturing device 15, and the image capturing device 16 is appropriately referred to as the sixth image capturing device 16. Further, when there is no need to distinguish these image capturing devices, these image capturing devices are appropriately referred to as the image capturing devices 11 to 16.

As illustrated in FIG. 4, six image capturing devices 11 to 16 are respectively attached to the outer peripheral portion of the dump truck 1 so as to capture the images in the periphery of the dump truck 1 by 360°. In the embodiment, each of the image capturing devices 11 to 16 has a viewing range of 120° (±60° at each of the left and right sides) in the left and right direction and 96° in the height direction, but the viewing range is not limited thereto. Further, the respective image capturing devices 11 to 16 are indicated by the arrows in FIG. 4, but the directions indicated by the arrows indicate the directions in which the respective image capturing devices 11 to 16 face.

As illustrated in FIG. 4, the first image capturing device 11 is attached to the front surface of the dump truck 1. Specifically, the first image capturing device 11 is disposed at the upper end of the inclined ladder 2d, and more specifically, the lower side of the landing portion of the uppermost stage. The first image capturing device 11 is fixed through the bracket which is attached to the upper deck 2b so as to face the front side of the dump truck 1. As illustrated in FIG. 5, the first image capturing device 11 captures a first region 11C in the region existing in the periphery of the dump truck 1 and outputs first image information as image information. The first region 11C is a region which is broadened toward the front side of the vehicle body portion 2 of the dump truck 1.

As illustrated in FIG. 4, the second image capturing device 12 is attached to one side portion of the front surface of the dump truck 1. Specifically, the second image capturing device 12 is disposed at the right portion of the front surface of the upper deck 2b. The second image capturing device 12 is fixed through the bracket attached to the upper deck 2b so as to face the diagonally forward right side of the dump truck 1. As illustrated in FIG. 5, the second image capturing device 12 captures a second region 12C in the region existing in the periphery of the dump truck 1 and outputs second image information as image information. The second region 12C is a region which is broadened toward the diagonally forward right side of the vehicle body portion 2 of the dump truck 1.

As illustrated in FIG. 4, the third image capturing device 13 is attached to the other side of the front surface of the dump truck 1. Specifically, the third image capturing device 13 is disposed at the left portion of the front surface of the upper deck 2b. Then, the third image capturing device 13 is disposed so as to be bilaterally symmetric to the second image capturing device 12 about the axis passing the center of the dump truck 1 in the vehicle width direction. The third image capturing device 13 is fixed through the bracket attached to the upper deck 2b so as to face the diagonally forward left side of the dump truck 1. As illustrated in FIG. 5, the third image capturing device 13 captures a third region 13C in the region existing in the periphery of the dump truck 1 and outputs third image information as image information. The third region 13C is a region which is broadened toward the diagonally forward left side of the vehicle body portion 2 of the dump truck 1.

As illustrated in FIG. 4, the fourth image capturing device 14 is attached to one side surface of the dump truck 1. Specifically, the fourth image capturing device 14 is disposed at the front portion of the right side surface of the upper deck 2b. The fourth image capturing device 14 is fixed through the bracket attached to the upper deck 2b so as to face the diagonally backward right side of the dump truck 1. As illustrated in FIG. 5, the fourth image capturing device 14 captures a fourth region 14C in the region existing in the periphery of the dump truck 1 and outputs fourth image information as image information. The fourth region 14C is a region which is broadened toward the diagonally backward right side of the vehicle body portion 2 of the dump truck 1.

As illustrated in FIG. 4, the fifth image capturing device 15 is attached to the other side surface of the dump truck 1. Specifically, the fifth image capturing device 15 is disposed at the front portion of the left side surface of the upper deck 2b. Then, the fifth image capturing device 15 is disposed so as to be bilaterally symmetric to the fourth image capturing device 14 about the axis passing the center of the dump truck 1 in the vehicle width direction. As illustrated in FIG. 5, the fifth image capturing device 15 captures a fifth region 15C in the region existing in the periphery of the dump truck 1 and outputs fifth image information as image information. The fifth region 15C is a region which is broadened toward the diagonally backward left side of the vehicle body portion 2 of the dump truck 1.

As illustrated in FIG. 4, the sixth image capturing device 16 is attached to the rear portion of the dump truck 1. Specifically, the sixth image capturing device 16 is disposed above an axle housing connecting two rear wheels 6 and 6 at the rear end of the frame 2f and near the rotary shaft of the vessel 4. The sixth image capturing device 16 is fixed toward the rear side of the dump truck 1 through the bracket which is attached to a crossbar connecting the left and right frames 2f. As illustrated in FIG. 5, the sixth image capturing device 16 captures a sixth region 16C in the region existing in the periphery of the dump truck 1 and outputs sixth image information as image information. The sixth region 16C is a region which is broadened toward the rear side of the vehicle body portion 2 of the dump truck 1.

By using the above-described six image capturing devices 11 to 16, the periphery monitoring system 10 according to the embodiment may capture the images in the entire circumference of the dump truck 1 by 360° and acquire the image information as illustrated in FIG. 5. Six image capturing devices 11 to 16 transmit the first image information to the sixth image information as the respectively captured image information items to the controller 100 illustrated in FIG. 3.

The first image capturing device 11, the second image capturing device 12, the third image capturing device 13, the fourth image capturing device 14, and the fifth image capturing device 15 are provided in the upper deck 2b which exists at the relatively high position. For this reason, the controller 100 may obtain an image which is seen from the bird's eye position toward the ground surface by the first image capturing device 11 to the fifth image capturing device 15 and hence may capture a subject (hereinafter, referred to as an appropriate object) such as a vehicle existing on the ground surface in a broad range. Further, even when the viewing point is changed upon causing the controller 100 to generate the bird's eye image 200 illustrated in FIG. 5 from the first image information to the sixth image information acquired by the first image capturing device 11 to the sixth image capturing device 16, the deformation degree of the three-dimensional object is suppressed since the first image information to the fifth image information in the first image information to the sixth image information are information items captured from the bird's eye position.

The periphery monitoring system 10 uses wide dynamic range cameras as the image capturing devices 11 to 16. For this reason, the image capturing devices 11 to 16 may brightly correct a dark portion such as a shadow of the dump truck 1 while maintaining a level at which a bright portion is visible. Accordingly, the over-exposure and under-exposure hardly occur in the images which are captured by the image capturing devices 11 to 16, and hence the images may be easily understood as a whole. As a result, the periphery monitoring system 10 with the image capturing devices 11 to 16 may display the bird's eye image 200 in which an object such as a vehicle existing in a region as a shadow of the dump truck 1 is easily visible on the monitor 50. In this way, even in an environment in which a contrast difference in contrast is large when the periphery monitoring system 10 monitors the periphery of the dump truck 1 by using the images captured by the image capturing devices 11 to 16, the periphery monitoring system may display the object around the dump truck 1 in the bird's eye image 200. As a result, the operator of the dump truck 1 may reliably see the object existing in the periphery of the dump truck 1, and particularly, the shadow region regardless of the environment.

In this way, since the periphery monitoring system 10 may generate the bird's eye image 200 which reliably displays the object around the dump truck 1 even in an environment in which a contrast difference in contrast is large, the object existing in the blind angle of the operator may be reliably recognized by the bird's eye image 200. Accordingly, the periphery monitoring system 10 may be very effectively used to monitor the periphery of the above-described super-jumbo dump truck 1 used in a mine. That is, there is a case in which the dump truck 1 forms a very large shadow region. Further, there is a case in which the dump truck moves while forming its shadow region and the shadow region largely changes by the elevation of the vessel 4. Further, there is a case in which the dead angle region is large. In such a dump truck 1, the periphery monitoring system 10 may provide the accurate information around the dump truck 1 for the operator of the dump truck 1 by generating the bird's eye image 200 reliably displaying the object around the dump truck 1. Further, the periphery monitoring system 10 may provided the accurate information around the dump truck 1 for the operator of the dump truck 1 with respect to the dump truck 1 which is operated in a place having a very large illumination difference between a sunny place and a shadow place like an equatorial region.

<Radar Device>

Figure 6:
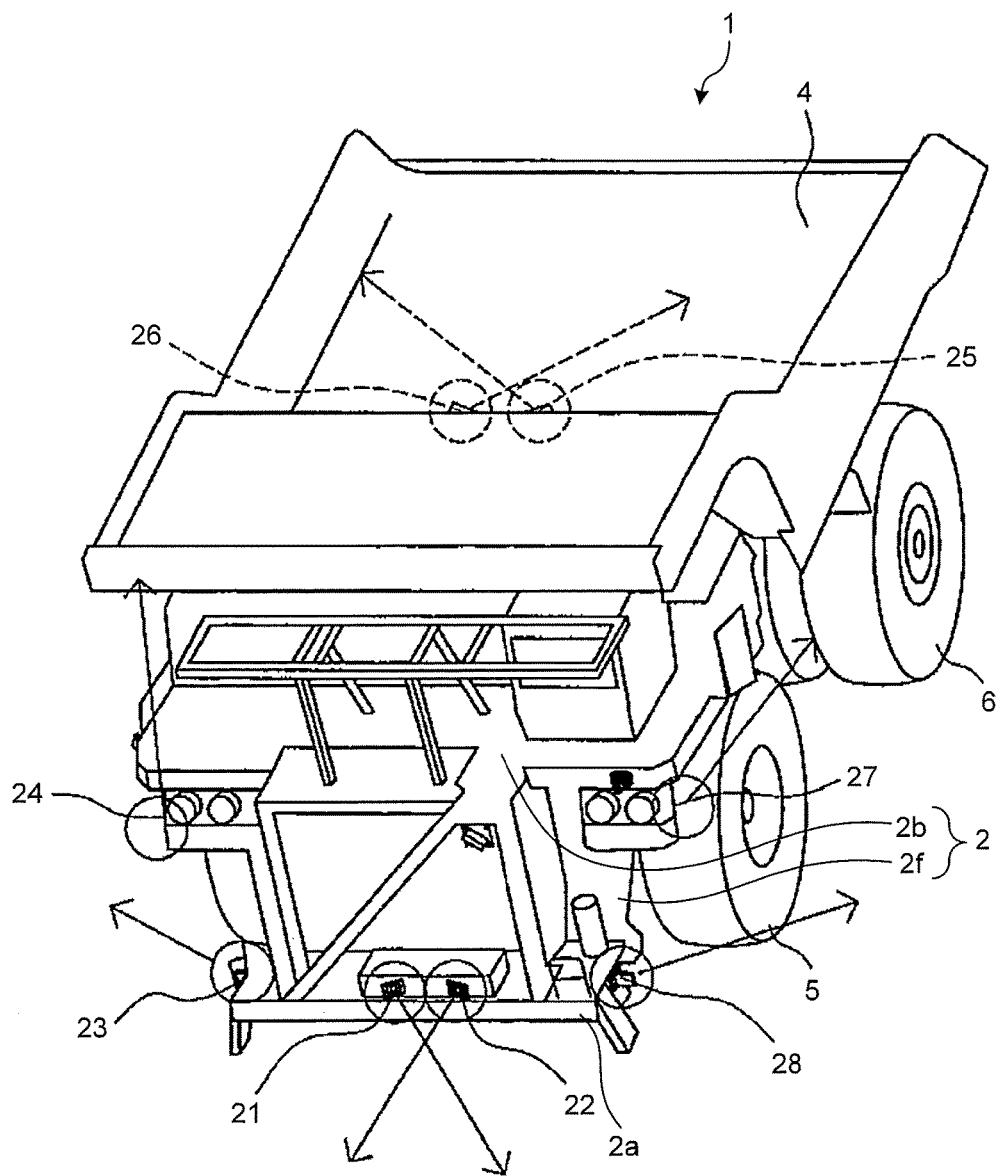
FIG. 6 is a perspective view illustrating an arrangement of radar devices 21 to 28.
Figure 7:
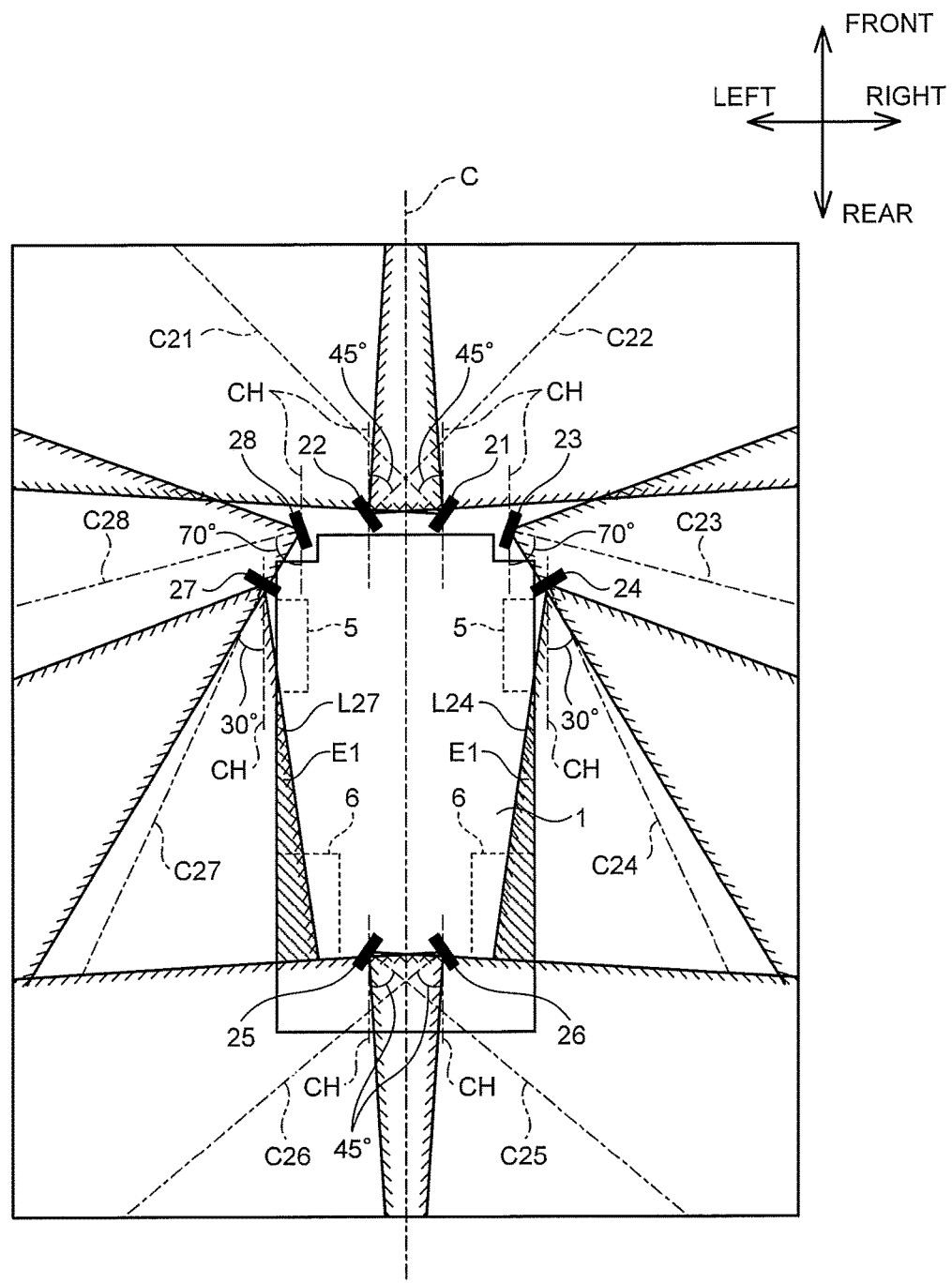
FIG. 7 is a diagram illustrating detection ranges of the respective radar devices 21 to 28.
Figure 8:
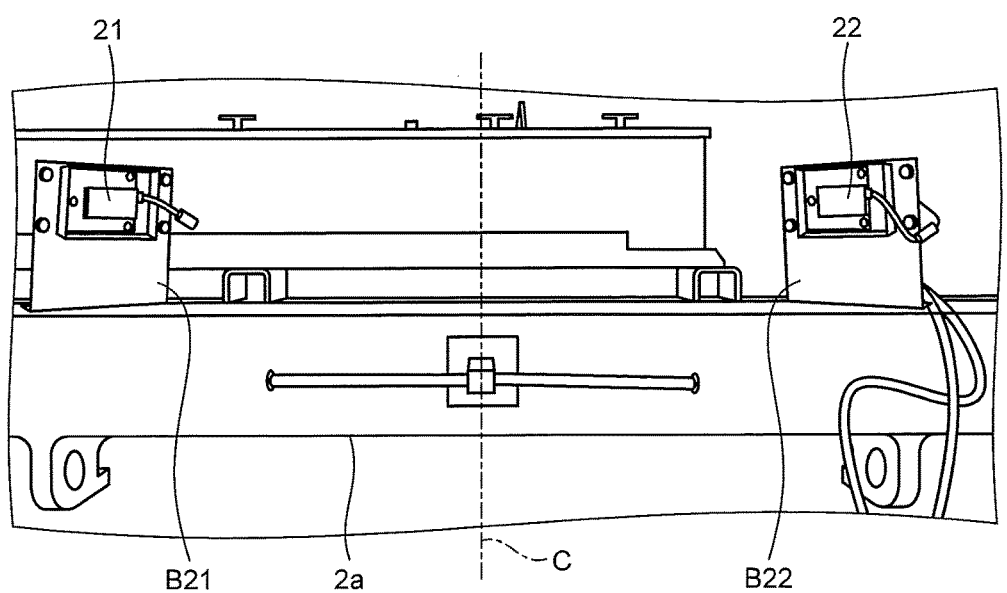
FIG. 8 is a diagram illustrating a specific arrangement of the radar devices 21 to 28 which detect the front side of the dump truck 1.
Figure 9:
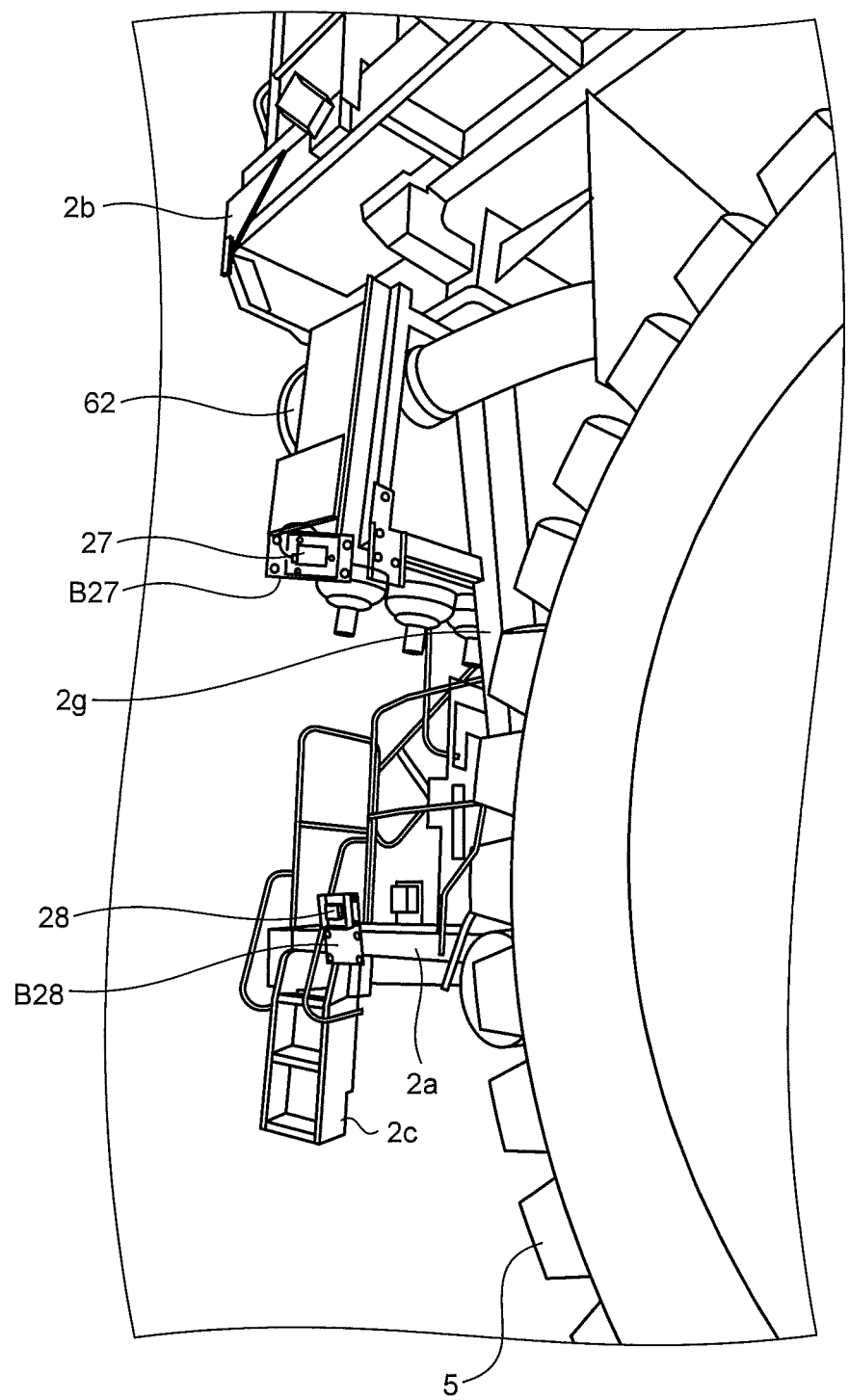
FIG. 9 is a diagram illustrating a specific arrangement of the radar devices 21 to 28 which detect the left side of the dump truck 1.
Figure 10:
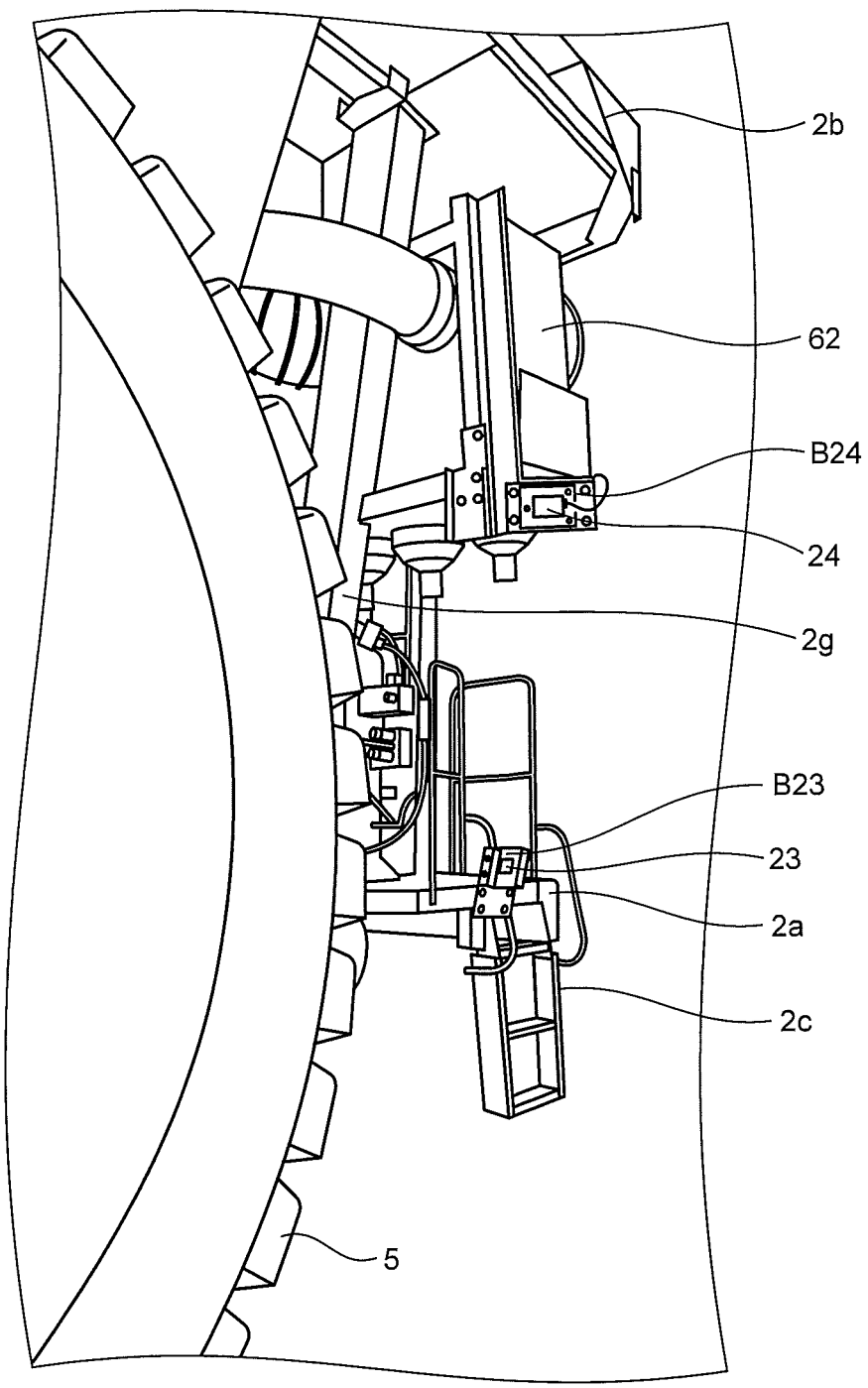
FIG. 10 is a diagram illustrating a specific arrangement of the radar devices 21 to 28 which detect the right side of the dump truck 1.
Figure 11:
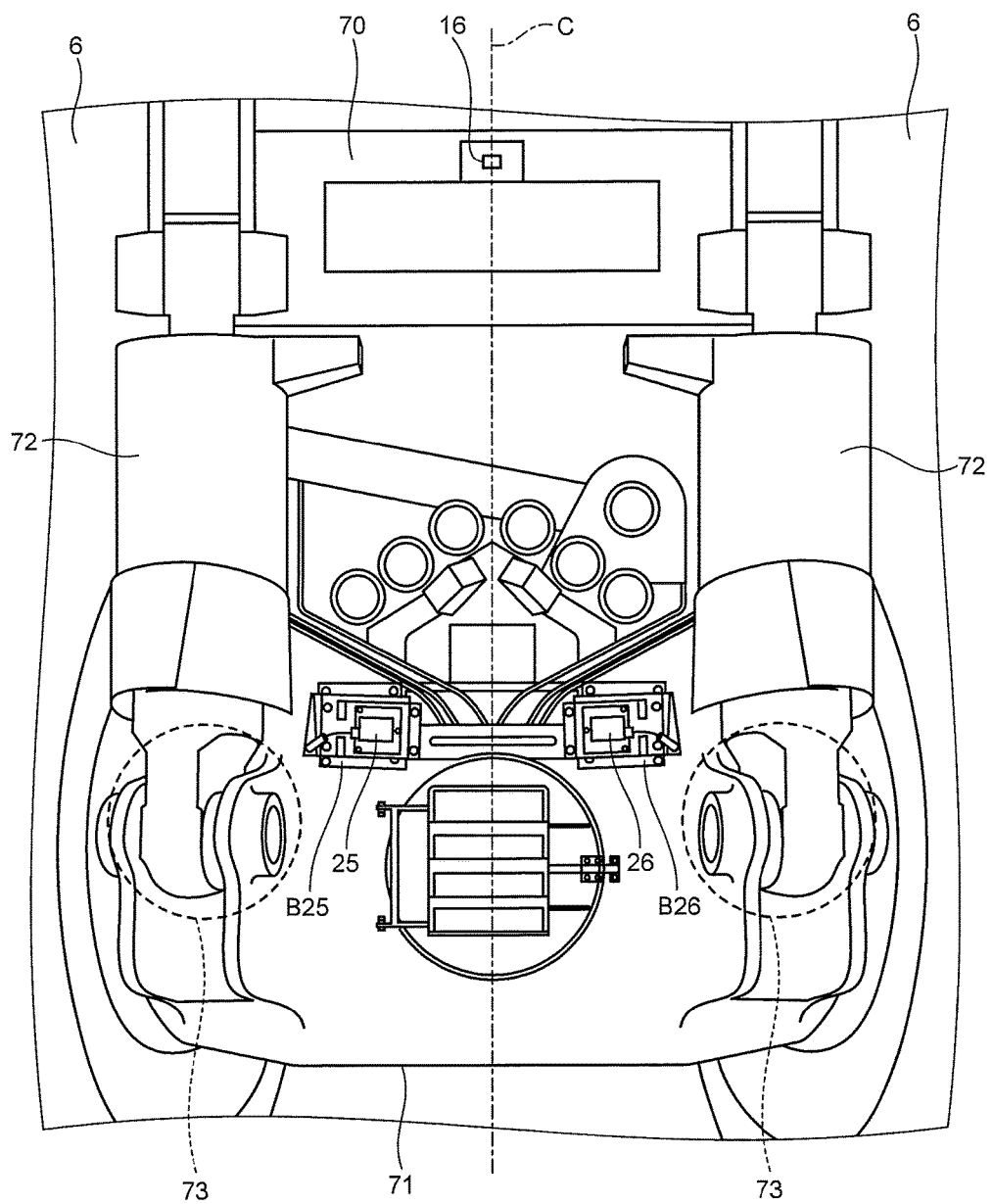
FIG. 11 is a diagram illustrating a specific arrangement of the radar devices 21 to 28 which detect the rear side of the dump truck 1.
Figure 12:
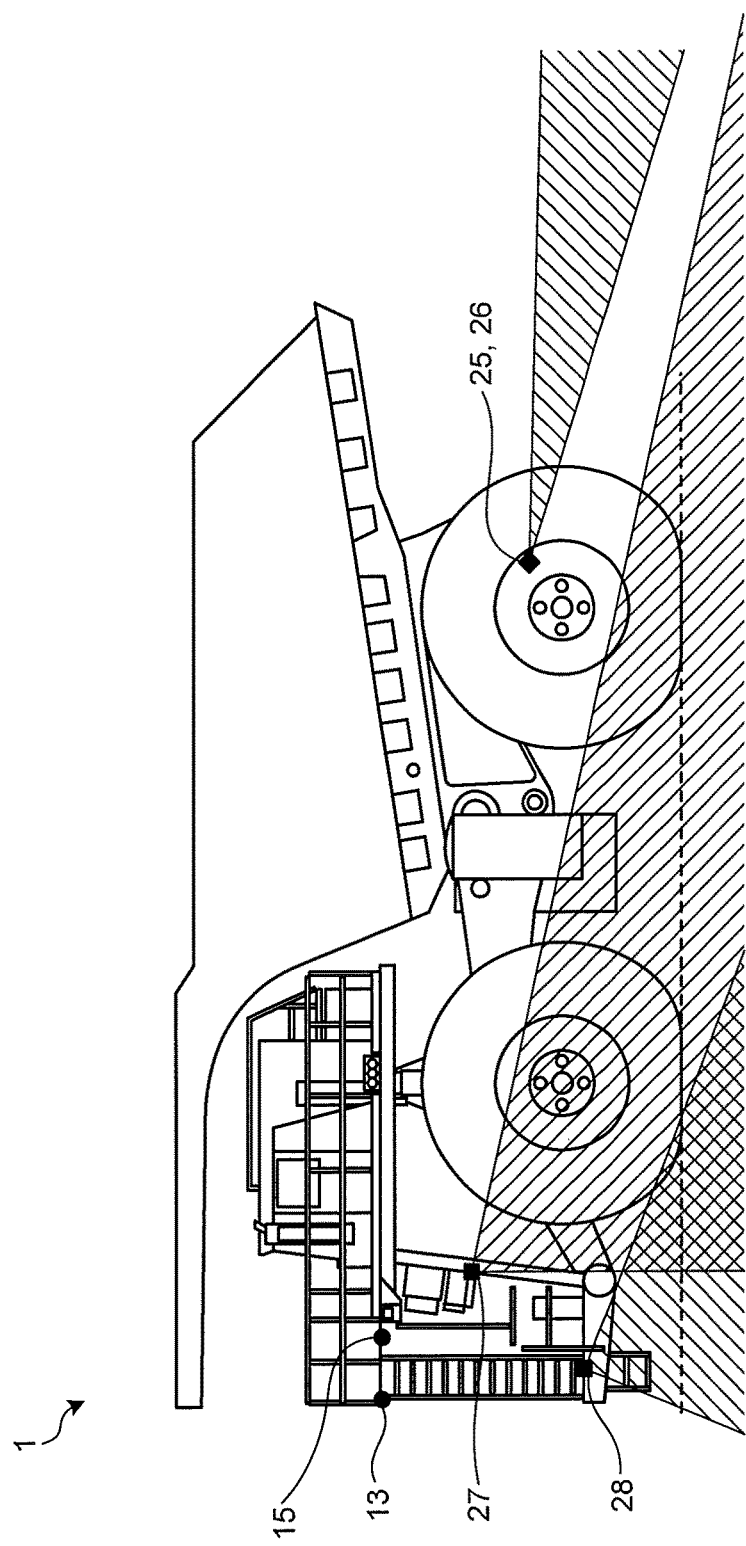
FIG. 12 is a diagram illustrating a left side surface of the dump truck 1 and an irradiation state of the radar devices 21 to 28.
Figure 13:
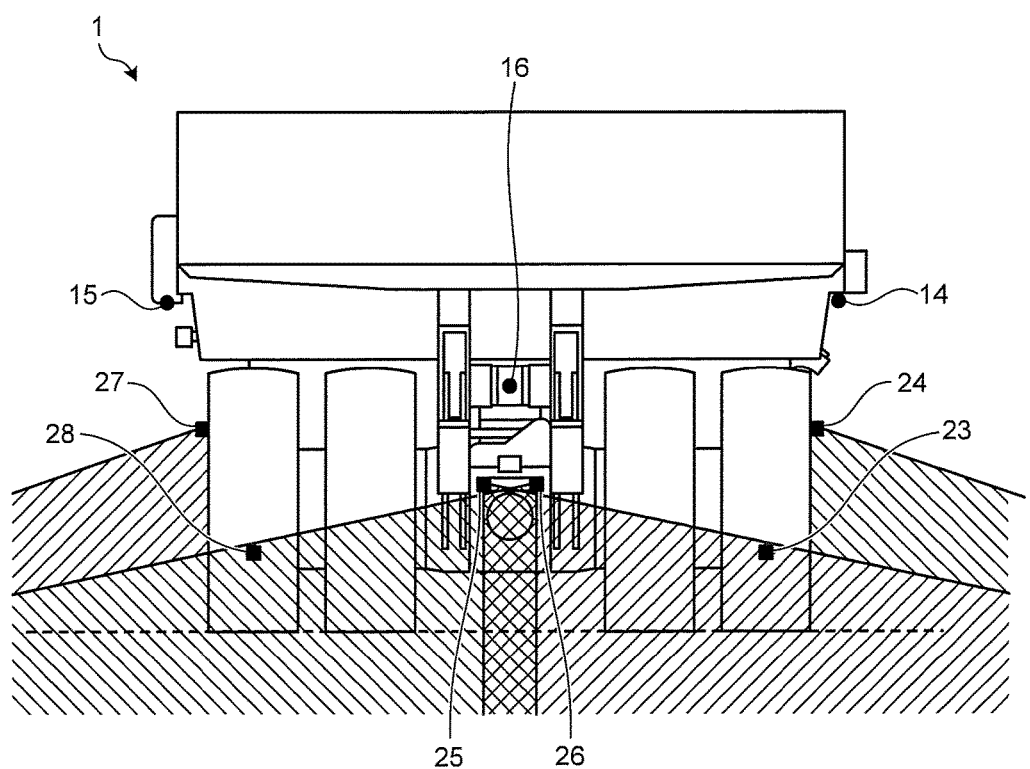
FIG. 13 is a diagram illustrating a rear side of the dump truck 1 and an irradiation state of the radar devices 21 to 28.

FIG. 6 is a perspective view illustrating an arrangement of the radar devices 21 to 28. FIG. 7 is a diagram illustrating detection ranges of the respective radar devices 21 to 28. FIG. 8 is a diagram illustrating a specific arrangement of the radar devices 21 to 28 which detect the front side of the dump truck 1. FIG. 9 is a diagram illustrating a specific arrangement of the radar devices 21 to 28 which detect the left side of the dump truck 1. FIG. 10 is a diagram illustrating a specific arrangement of the radar devices 21 to 28 which detect the right side of the dump truck 1. FIG. 11 is a diagram illustrating a specific arrangement of the radar devices 21 to 28 which detect the rear side of the dump truck 1. FIG. 12 is a diagram illustrating a left side surface of the dump truck 1 and an irradiation state of the radar devices 21 to 28. FIG. 13 is a diagram illustrating a rear side of the dump truck 1 and an irradiation state of the radar devices 21 to 28.

In the embodiment, each of the radar devices 21, 22, 23, 24, 25, 26, 27, and 28 (hereinafter, referred to as appropriate radar devices 21 to 28) as the object detecting device is a ultra wide band (UWB) radar which has, for example, a detection angle of 80° (±40°) in the orientation (horizontal) direction and 16° (±8°) in the up and down (vertical) direction and a maximum detection distance of 15 m or more. The radar devices 21 to 28 detect a position (relative position) of the object existing in the periphery of the dump truck 1 relative to the dump truck 1. The respective radar devices 21 to 28 are attached to the outer peripheral portion of the dump truck 1 as in the image capturing devices 11 to 16. The detection angle of each of the radar devices 21 to 28 in the orientation (horizontal) direction is set to 80° (±40°), but the radar device may have a larger detection angle. Further, the respective radar devices 21 to 28 are indicated by the arrows in FIG. 6, but the direction indicated by the arrows indicate the detection ranges of the respective radar devices 21 to 28.

The radar devices 21 and 22 will be described by mainly referring to FIG. 6 and FIG. 8 illustrating the front side view of the dump truck 1. The radar devices 21 and 22 are provided below the inclined ladder 2d and on the lower deck 2a which is positioned below the upper deck 2b and is positioned at the height of about 1 m from the ground surface. The radar devices 21 and 22 are respectively attached so as to be bilaterally symmetric to each other about the vehicle center plane C through the brackets B21 and B22. Here, as the axis inside the vehicle center plane C, a line connecting two points placed at the same height from the ground surface inside the dump truck 1 and extending forward from the rear side of the dump truck 1 inside the vehicle center plane C is defined as the reference axis. The one-dotted chain line CH illustrated in FIG. 7 indicates the line which is parallel to the reference axis inside the vehicle center plane C with respect to the left and right direction of the dump truck 1. Hereinafter, a specific example of attaching the radar devices 21 and 22 will be described.

The radar device 21 is disposed toward the diagonally forward left side and the radar device 22 is disposed toward the diagonally forward right side. Specifically, as illustrated in FIG. 7, the irradiation center axis C21 of the radar device 21 in the horizontal direction is inclined by 45° toward the left side of the dump truck 1 in the counter-clockwise direction from the reference axis as the reference axis inside the center plane (hereinafter, referred to as an appropriate vehicle center plane) C of the dump truck 1. The irradiation center axis C22 of the radar device 22 in the horizontal direction is inclined by 45° toward the right side of the dump truck 1 in the clockwise direction from the reference axis as the reference axis inside the vehicle center plane C. The respective irradiation center axes C21 and C22 intersect each other. Further, each of the irradiation center axes of the radar devices 21 and 22 in the vertical direction has a depression angle of about 5°. With such a configuration, it is possible to detect all obstacles in a front region from the front end of the dump truck 1.

The radar device 28 and the radar device 23 which are disposed so as to be bilaterally symmetric to each other about the vehicle center plane C will be described by referring to FIG. 6, FIG. 9 illustrating the left side view of the dump truck 1, and FIG. 10 illustrating the right side view of the dump truck 1. The radar device 28 is provided at the left end of the lower deck 2a and near the upper end of the ladder 2c positioned below the upper deck 2b which is provided with the image capturing devices 13 and 15 mainly capturing the left side of the radar devices 21 and 22. The radar device 28 is attached to the lower deck 2a through the bracket B28, and is disposed so as to face the left side and the outside of the radar devices 21 and 22.

The radar device 23 is provided at a position bilaterally symmetric to the radar device 28 about the vehicle center plane C as illustrated in FIG. 10 illustrating the right side view of the dump truck 1 or FIG. 7 to be described later in detail. The radar device 23 is provided at the position of the right end of the lower deck 2a and of the ladder 2c provided at the right side of the dump truck 1 positioned below the upper deck 2b which is provided with the image capturing devices 12 and 14 mainly capturing the right side of the dump truck 1. The radar device 23 is attached to the lower deck 2a through the bracket B23 so as to face the right side and the outside of the dump truck 1.

FIG. 7 illustrates detection ranges of the radar devices 21 to 28. First, a specific attachment example of the radar devices 23 and 28 disposed so as to be bilaterally symmetric to each other about the vehicle center plane C will be described. The irradiation center axis C23 of the radar device 23 in the horizontal direction is inclined by 70° toward the right side of the dump truck 1 in the counter-clockwise direction from the reference axis as the reference axis inside the vehicle center plane C. The irradiation center axis C28 of the radar device 28 in the horizontal direction is inclined by 70° toward the left side of the dump truck 1 in the clockwise direction from the reference axis as the reference axis inside the vehicle center plane C. Further, each of the irradiation center axes of the radar devices 23 and 28 in the vertical direction has a depression angle of about 5°.

The radar devices 23 and 28 detect the object which exists at the side of the dump truck 1, and particularly, at the front side of the front wheel 5 and the rear wheel 6. Further, since the radar devices 23 and 28 are positioned below the vessel 4 and the upper deck 2b, the radar devices are not easily influenced by the collision with rocks flying out from the vessel 4 during the loading operation.

The radar device 27 and the radar device 24 which are disposed so as to be bilaterally symmetric to each other about the vehicle center plane C will be described by referring to FIG. 6, FIG. 9 illustrating the left side view of the dump truck 1, and FIG. 10 illustrating the right side view of the dump truck 1. The radar device 27 is disposed at the side end of an air cleaner 62. The air cleaner 62 is provided at a position protruding from a front fender 2g which is positioned at the left side of the dump truck 1 and extends toward the lower deck 2a positioned below the upper deck 2b. The upper deck 2b is provided with the image capturing devices 13 and 15 which mainly capture the left side of the dump truck 1. The radar device 27 is attached to the front fender 2g through the bracket B27 so as face backward. In the embodiment, the attachment height of the radar device 27 is away from the ground surface by about 2.5 m, but the attachment height may be appropriately defined depending on the attachment height of the dump truck 1. The attachment heights of the other radar devices 21 to 26 and 28 may be appropriately defined depending on the size of the dump truck 1.

As illustrated in FIGS. 6 and 7, the radar device 24 is provided at a position which is bilaterally symmetric to the radar device 27 about the vehicle center plane C. The radar device 24 is disposed at the side end of the air cleaner 62. The air cleaner 62 is provided at a position protruding rightward from the right front fender 2g, extending toward the lower deck 2a positioned below the upper deck 2b, of the dump truck 1. The upper deck 2b includes the image capturing devices 12 and 14 which mainly capture the right side of the dump truck 1. The radar device 24 is attached to the front fender 2g through the bracket B24 so as to face backward.

Next, a specific attachment example of the radar devices 24 and 27 will be described. The irradiation center axis C24 of the radar device 24 in the horizontal direction is inclined by 30° toward the right side of the dump truck 1 in the counter-clockwise direction from the reference axis as the reference axis inside the vehicle center plane C. The irradiation center axis C27 of the radar device 27 in the horizontal direction is inclined by 30° toward the left side of the dump truck 1 in the clockwise direction from the reference axis as the reference axis inside the vehicle center plane C. Such an angle is not limited to 30° and may be 45° or less. That is, the angle may be set such that the rear limit lines L24 and L27 in the horizontal detection range face the vehicle center plane C and the irradiation region is provided with a vehicle overlapping region E1 including the front wheel 5 and the rear wheel 6. It is desirable to direct the irradiation center axes C24 and C27 so that the front wheel 5 is slightly included in the irradiation region and the ground contact portion of the rear wheel 6 is included in the irradiation region. Each of the irradiation center axes of the radar devices 24 and 27 in the vertical direction has a depression angle of about 15°. The vehicle overlapping region E1 is a region in which the region inside the dump truck 1 overlaps the irradiation region and is included in the vehicle region to be described later.

The radar devices 24 and 27 detect the object which exists at the side of the dump truck 1, and particularly, the rear region corresponding to the entire region at the side of the vessel. Further, since the respective radar devices 24 and 27 are positioned below the vessel 4 and the upper deck 2b, the radar devices are not easily influenced by the collision with rocks flying out from the vessel 4 during the loading operation.

As illustrated in FIG. 7, the side detection ranges of the radar devices 23 and 24 in the horizontal direction and the side detection ranges of the radar devices 27 and 28 in the horizontal direction respectively include overlapping regions. For this reason, the radar devices 23, 24, 27, and 28 may completely detect the object which exists in both side regions from the front end of the dump truck 1 to the rear end thereof. Further, the radar devices 23 and 24 which are disposed at the right side of the dump truck 1 at the left symmetric position of the dump truck 1 provided with the cab 3 may detect the object which exists at the right side of the dump truck 1 and is not easily seen from the cab 3.

The radar devices 25 and 26 will be described by referring to FIG. 6 and FIG. 11 illustrating the rear side view of the dump truck 1. The radar devices 25 and 26 are disposed at the height of about 2 m from the ground surface and are disposed at the rear side of a casing of a rear axle 71 of a driving shaft of the rear wheel 6 position positioned below a cross member 70 provided with the image capturing device 16 of the vessel 4. Furthermore, the attachment heights of the radar devices 25 and 26 may be appropriately defined depending on the size of the dump truck 1. The radar devices 25 and 26 are respectively attached through the brackets B25 and B26 so as to be bilaterally symmetric to each other about the vehicle center plane C. Further, the radar devices 25 and 26 are provided between bonding portions 73 of rear suspension cylinders 72. The radar device 25 is disposed so as to face the diagonally backward right side and the radar device 26 is disposed so as to face the diagonally backward left side.

As illustrated in FIG. 7, the irradiation center axis C25 of the radar device 25 in the horizontal direction is inclined by 45° toward the right side of the dump truck 1 in the counter-clockwise direction from the reference axis as the reference axis inside the vehicle center plane C. The irradiation center axis C26 of the radar device 26 in the horizontal direction is inclined by 45° toward the left side of the dump truck 1 in the clockwise direction from the reference axis as the reference axis inside the vehicle center plane C. The respective irradiation center axes C25 and C26 intersect each other on the vehicle center plane C below the vessel 4. Further, each of the irradiation center axes of the radar devices 25 and 26 in the vertical direction has a depression angle of 0 to 10°, and in the embodiment, about 5° in the depression angle direction.

The respective radar devices 25 and 26 are attached so as to be bilaterally symmetric to each other about the vehicle center plane C and the respective irradiation center axes C25 and C26 intersect each other. For this reason, it is possible to completely detect the object which exists in the rear region in the rear end of the dump truck 1. In particular, the radar devices 25 and 26 are disposed in the casing of the rear axle 71 lower than the cross member 70 so as to have a small depression angle. As illustrated in FIGS. 12 and 13, the radar devices 25 and 26 which are provided at the low position of the dump truck 1 so as to have a small depression angle may simultaneously detect the object far from the dump truck 1 and the object hidden at the lower side or the rear side of the vessel 4. In the embodiment, the irradiation center axis C25 of the radar device 25 in the horizontal direction and the irradiation center axis C26 of the radar device 26 in the horizontal direction are set to 45° with respect to the vehicle center plane C, but may be 45° or less. For example, the angle may be 30°. The value may be defined depending on the backward projection degree of the radar devices 25 and 26 with respect to the rear end of the rear wheel 6.

Eight radar devices 21 to 28 may detect the relative position between the dump truck 1 and the object in the detection range in the entire circumference of the dump truck 1 by 360°. Eight radar devices 21 to 28 respectively transmit the relative position information items representing the relative positions between the respectively detected objects and the dump truck 1 to the controller 100. In this way, a plurality of (eight) radar devices 21 to 28 are provided in the vehicle body portion 2, and may detect the object which exists in the entire circumference of the vehicle body portion 2.

The radar devices 21 to 28 which detect the objects existing in the respective directions of the dump truck 1 are attached to the members lower than the respective image capturing devices 11 to 16 which capture the respective directions of the dump truck 1 so as to generate the bird's eye image 200. It is possible to reduce a sense of discomfort for the generated bird's eye image 200 when the respective image capturing devices 11 to 16 are disposed at a high position so as to generate the bird's eye image 200. Further, even when using a radar device of which an irradiation region has a narrow angle in the perpendicular direction, it is possible to detect the objects from the near position to the far position of the dump truck 1 by providing the radar device at a position lower than the image capturing devices 11 to 16. As a result, it is possible to display a mark corresponding to the object position information detected by the radar devices 21 to 28 in the bird's eye image 200 which is generated by the capturing operation of the image capturing devices 11 to 16 in the bird's eye image 200. In a case where the radar devices 21 to 28 are provided at a high position, the irradiation regions of the radar devices 21 to 28 have narrow angles. Accordingly, when the direction of the irradiation center axis is adjusted to the far position of the dump truck 1 so as to detect the object at the far position, the near object is not detected. On the contrary, when the direction of the irradiation center axis is adjusted to the near position of the dump truck 1 so as to detect the object at the near position, the far object is not detected.

<Controller>

The controller 100 illustrated in FIG. 3 displays the existence of the object in the periphery of the dump truck 1 in the bird's eye image 200 by using the image capturing devices 11 to 16 and the radar devices 21 to 28 and notifies the existence of the object to the operator. As illustrated in FIG. 3, the controller 100 includes an bird's eye image synthesizing unit 110, a camera image switching/viewing point changing unit 120, an object position information generating unit 130, a display control unit 140, an alarm control unit 150, a storage unit 160, an object information collecting unit 210, and an object processing unit 220.

The bird's eye image synthesizing unit 110 is connected to the image capturing devices 11 to 16 as illustrated in FIG. 3. The bird's eye image synthesizing unit 110 receives a plurality of image information items (the first image information to the sixth image information) which are respectively generated by the capturing of the respective image capturing devices 11 to 16. Then, the bird's eye image synthesizing unit 110 synthesizes the images corresponding to the received plurality of image information items and generates the bird's eye image 200 including the entire periphery of the dump truck 1. Specifically, the bird's eye image synthesizing unit 110 generates the bird's eye image information for displaying the bird's eye image 200, obtained by projecting a plurality of images onto a predetermined projection plane, on the monitor 50 by respectively changing the coordinates of the plurality of image information items.

As illustrated in FIG. 3, the camera image switching/viewing point changing unit 120 is connected to the image capturing devices 11 to 16. Then, the camera image switching/viewing point changing unit 120 switches the bird's eye image 200 and the images captured by the respective image capturing devices 11 to 16 and displayed on the screen of the monitor 50 in response to, for example, the obstacle detection result by the radar devices 21 to 28. Further, the camera image switching/viewing point changing unit 120 changes the image information items acquired by the respective image capturing devices 11 to 16 to the image information from the viewing point of the upward infinity.

As illustrated in FIG. 3, the object position information generating unit 130 is configured to transmit the control information, the control data, and the like to the camera image switching/viewing point changing unit 120, the display control unit 140, and the alarm control unit 150. The object position information generating unit 130 generates the object position information for synthesizing and displaying the object position information acquired by the radar devices 21 to 28 in the bird's eye image 200 which is formed by synthesizing the image information acquired by the respective image capturing devices 11 to 16 and transmits the result to the camera image switching/viewing point changing unit 120 and the display control unit 140.

As illustrated in FIG. 3, the display control unit 140 is configured to receive the control information, the control data, and the like from the bird's eye image synthesizing unit 110, the camera image switching/viewing point changing unit 120, the object position information generating unit 130, and the alarm control unit 150. The display control unit 140 generates the bird's eye image 200 including the position of the object based on the bird's eye image information in the entire periphery of the dump truck 1 generated by the bird's eye image synthesizing unit 110 and the object position information in the entire periphery of the dump truck 1 acquired by the radar devices 21 to 28. The image is displayed on the monitor 50. In this way, the display control unit 140 may notify the existence of the object in the periphery of the dump truck 1 as an alarm to the operator of the dump truck 1 by displaying the mark representing the object existing in the periphery of the dump truck 1 on the monitor 50 based on the object position information. Furthermore, the display control unit 140 may display the mark representing the object existing in the periphery of the dump truck 1 on the monitor 50 together with the image generated by the image information acquired by the image capturing devices 11 to 16.

The alarm control unit 150 acquires the respective outputs (the detection signals, the control signals, or the like) from the object position information generating unit 130, a shift lever position sensor 37S, the parking brake operation switch 37P, a dump lever position sensor 38S, a payload control device 40, and a vessel sitting sensor 43. Further, the alarm control unit 150 transmits the respective control signals to an alarm sounding device 51 with a speaker and the like, the display control unit 140, and the radar devices 21 to 28.

The alarm control unit 150 acquires the information of the object, transmitted from the object position information generating unit 130, detected by the radar devices 21 to 28, and existing around the dump truck 1. The information of the object includes the object position information and the information of the object which is detected by the radar devices 21 to 28. The alarm control unit 150 which acquires the information of the object generates, for example, an alarm sound using the alarm sounding device 51. Further, the alarm control unit 150 transmits an instruction for displaying a mark as control information to the display control unit 140. The display control unit 140 which receives the instruction displays a mark corresponding to the detected object in the bird's eye image 200 displayed on the monitor 50. In this way, the alarm control unit 150 generates an alarm, that is, an alarm with respect to the existence of the object around the dump truck 1 based on the detection results of the radar devices 21 to 28.

The alarm control unit 150 selects a notification mode for notifying an alarm or a restriction mode for restricting the notification of the alarm in response to the state of the dump truck 1. For example, the alarm control unit 150 acquires a detection signal from the shift lever position sensor 37S, the parking brake operation switch 37P, the dump lever position sensor 38S, the payload control device 40, or the vessel sitting sensor 43. The detection signal is the information (appropriately referred to as the vehicle state information) on the state of the dump truck 1. The alarm control unit 150 selects the notification mode or the restriction mode based on the acquired work vehicle state information.

The notification mode is a mode for generating an alarm in a manner such that the alarm control unit 150 generates an alarm sound or displays a mark on the monitor 50 when the radar devices 21 to 28 detect the object existing around the dump truck 1. The restriction mode is a mode in which the alarm control unit 150 restricts the notification of the alarm corresponding to the object detected by the radar devices 21 to 28 when the radar devices 21 to 28 detect the object existing around the dump truck 1. For example, it is possible to restrict the generation of the alarm sound and the display of the mark on the monitor 50. The restriction of the notification of the alarm includes, for example, a case where the alarm is notified by the sound and the mark, a case where the alarm is notified only by the mark while stopping the notification of the sound, a case where the alarm is generated only by the sound while stopping the notification of the mark, and a case where the notification of both the sound and the mark is stopped. That is, in the embodiment, the restriction of the notification of the alarm indicates a case where at least one of the notification with respect to the sound and the notification with respect to the vision is stopped. In this way, the alarm control unit 150 controls the notification of the alarm.

The payload control device 40 which is connected to the alarm control unit 150 is a device which obtains the weight (the loading amount) of the load loaded on the vessel 4, that is, the payload and outputs the result. The payload control device 40 is electrically connected with a pressure sensor 41. A suspension (not illustrated) is provided in each of the left and right front wheels 5 and the left and right rear wheels 6 of the dump truck 1. That is, the dump truck 1 includes four suspensions, and each suspension includes a suspension cylinder enclosing oil therein. The pressure sensor 41 is attached to each suspension cylinder. That is, the dump truck 1 is equipped with four pressure sensors 41. Then, four pressure sensors 41 detect the pressures (for example, the bottom pressures) of the oils inside the respective suspension cylinders. The payload control device 40 obtains the payload based on the detection result of the pressure sensor 41 and outputs the result. The vessel sitting sensor 43 is a sensor which detects a state in which the vessel 4 stands from the frame 2f of the dump truck 1, is lowered toward the frame 2f, and is returned to the original position so as to become the loading posture. As the vessel sitting sensor 43, various position detecting sensors such as a limit switch or an ultrasonic sensor may be used.

The shift lever position sensor 37S detects the position of the shift lever 37. For this reason, it is possible to recognize any one of the running modes such as a forward running mode, a backward running mode, a neutral mode, and a parking mode of the dump truck 1 and the gear shift stage of the dump truck 1 from the detection result of the shift lever position sensor 37S. The parking brake operation switch 37P is operated so as to operate the parking brake when the dump truck 1 is parked. Even by the output of the parking brake operation switch 37P, the parking of the dump truck 1 may be recognized. The dump lever position sensor 38S detects the position of the dump lever 38. For this reason, the controller 100 may recognize whether the dump truck 1 discharges a load from the detection result of the dump lever position sensor 38S.

The storage unit 160 stores a computer program for executing the control of the alarm when the dump truck 1 loads a load thereon and data necessary for the control of the alarm. The alarm control unit 150, the display control unit 140, and the like execute the control of the alarm by reading and executing the computer program stored in the storage unit 160 or reading the data necessary for the control of the alarm.

As illustrated in FIG. 3, the object information collecting unit 210 is connected to the radar devices 21 to 28. Further, the object information collecting unit 210 is configured to transmit the control information, the control data, and the like to the object processing unit 220. The object information collecting unit 210 receives the object detection result in the respective detection ranges of the radar devices 21 to 28 and transmits the object detection result to the object processing unit 220.

As illustrated in FIG. 3, the object processing unit 220 transmits the object position information received from the object information collecting unit 210 to the object position information generating unit 130.

The controller 100 is configured by the combination of, for example, a computer including a CPU (Central Processing Unit) as a calculation device and a storage device and an image processing device (for example, an image board) executing an image process such as a synthesis of the bird's eye image. The image processing device is equipped with, for example, an exclusive IC (for example, FPGA: Field-Programmable Gate Array) executing an image process such as a synthesis of the bird's eye image, a memory (for example, VRAM: Video Random Access Memory), and the like.

In the embodiment, as illustrated in FIG. 4, the image capturing devices 11 to 16 are disposed at the front surface and the side surface of the upper deck 2b and below the vessel 4. Then, the controller 100 generates the bird's eye image 200 illustrated in FIG. 5 by synthesizing the first image information to the sixth image information captured and acquired by the image capturing devices 11 to 16 and displays the result on the monitor 50 which is disposed at the front side of the driver seat 31 inside the cab 3. At this time, the monitor 50 displays an image such as the bird's eye image 200 in response to the control of the controller 100. The bird's eye image 200 may be obtained by the controller 100 through the synthesizing of the first image information to the sixth image information corresponding to the first region 11C to the sixth region 16C captured by the image capturing devices 11 to 16. The periphery monitoring system 10, and more specifically, the display control unit 140 of the controller 100 displays the bird's eye image 200 on the monitor 50. Further, the display control unit 140 acquires the object position information generated by the object position information generating unit 130 and displays the mark representing the object existing in the periphery of the dump truck 1 in, for example, the bird's eye image 200 of the monitor 50. By using the periphery monitoring system 10, the operator of the dump truck 1 may monitor the entire range of 360° in the periphery of the dump truck 1 just by seeing the bird's eye image 200 displayed on the monitor 50.

<Example of Image Displayed on Monitor 50 by Controller 100>

Figure 14:
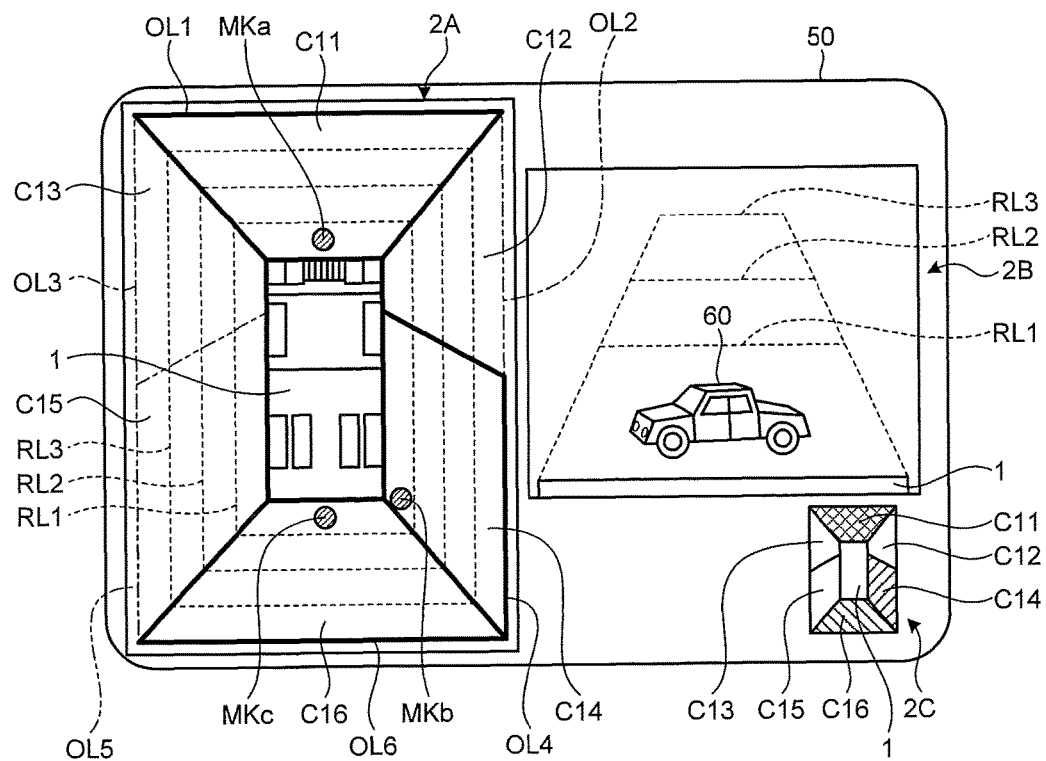
FIG. 14 is a diagram illustrating an example of an image which is displayed on a monitor 50 by a controller 100.
Figure 14:
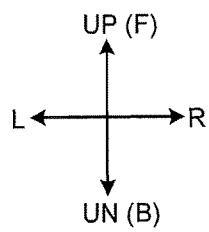

FIG. 14 is a diagram illustrating an example of an image displayed on the monitor 50 by the controller 100. In FIG. 14, the upper side UP, the lower side UN, the left side L, and the right side R of the monitor 50 are illustrated. The front side F and the rear side B of the dump truck 1 are illustrated. The dump truck 1 is displayed on the monitor 50 so that the upper side of the monitor 50 becomes the front side of the dump truck 1 and the lower side of the monitor 50 becomes the rear side of the dump truck 1. In the embodiment, the monitor 50 displays a first image 2A, a second image 2B, and a third image 2C on the same screen. In a case where the alarm is notified, at least one of the first image 2A, the second image 2B, and the third image 2C may be displayed on the monitor 50.

The first image 2A includes alarm regions C11 to C16 corresponding to the first region 11C to the sixth region 16C existing around the dump truck 1 illustrated in FIG. 5. The alarm regions C11 to C16 respectively include boundaries OL1 to OL6 with respect to the adjacent alarm regions. In the alarm regions C11 to C16, the boundaries OL1 to OL6 are highlighted when the mark indicating the object existing around the dump truck 1 exists inside the boundaries OL1 to OL6. In the example illustrated in FIG. 14, since the marks MKa, MKb, and MKc respectively exist in the alarm regions C11, C14, and C16, the boundaries OL1, OL4, and OL6 are highlighted. The boundaries OL1, OL4, and OL6 are emphasized by, for example, displaying the boundaries in red or in a flickering state.

In the first image 2A, the dotted lines RL1, RL2, and RL3 are displayed around the dump truck 1. The dotted line RL1 is displayed at a position close to the dump truck 1 and the dotted line RL3 is displayed at a position far from the dump truck 1. The dotted line RL2 is displayed between the dotted line RL1 and the dotted line RL3. The dotted lines RL1, RL2, and RL3 respectively indicate positions away from the dump truck 1 by a predetermined distance. The operator of the dump truck 1 may recognize each distance of the marks MKa, MKb, and MKc displayed on the first image 2A with respect to the dump truck 1 by the dotted lines RL1, RL2, and RL3.

The second image 2B is an image which is captured by at least one of the plurality of image capturing devices 11 to 16. The periphery monitoring system 10 displays an image captured by the image capturing devices 11 to 16 as the second image 2B on the monitor 50. In this way, the operator of the dump truck 1 may see the peripheral environment of the dump truck 1. In the example illustrated in FIG. 14, a vehicle 60 existing before the dump truck 1 is displayed in the second image 2B. The vehicle 60 corresponds to the mark MKa.

In the third image 2C, the dump truck 1 and the first alarm region C11 to the sixth alarm region C16 are simply depicted and displayed. The third image 2C illustrates at least one of the position as the subject of the alarm and the position displayed by the second image 2B. By such an image structure, the third image 2C has a function of illustrating the relation between the first image 2A and the second image 2B. The position as the subject of the alarm is a region where the marks MKa, MKb, and MKc exist. In this example, the first alarm region C11, the fourth alarm region C14, and the sixth alarm region C16 are provided. In the example illustrated in FIG. 14, the regions are indicated by a mesh or a hatching.

The position in which the second image 2B is displayed is the first alarm region C11. In the example illustrated in FIG. 14, the region is indicated by a mesh. In this way, the third image 2C displays the alarm region which becomes the subject of the alarm and the alarm region in which the images captured by the image capturing devices 11 to 16 are displayed as the second image 2B in different manners. The operator of the dump truck 1 may intuitively recognize the region in which the object exists and the alarm region which is displayed as the second image 2B by seeing the third image 2C displayed on the monitor 50. For this reason, it is becomes easier for the operator to further reliably and accurately recognize the positional relation between the dump truck 1 and the object. Next, the control (appropriately referred to as the load loading alarm control) of the alarm when the dump truck 1 loads the load will be described.

<Load Loading Alarm Control>

Figure 15:
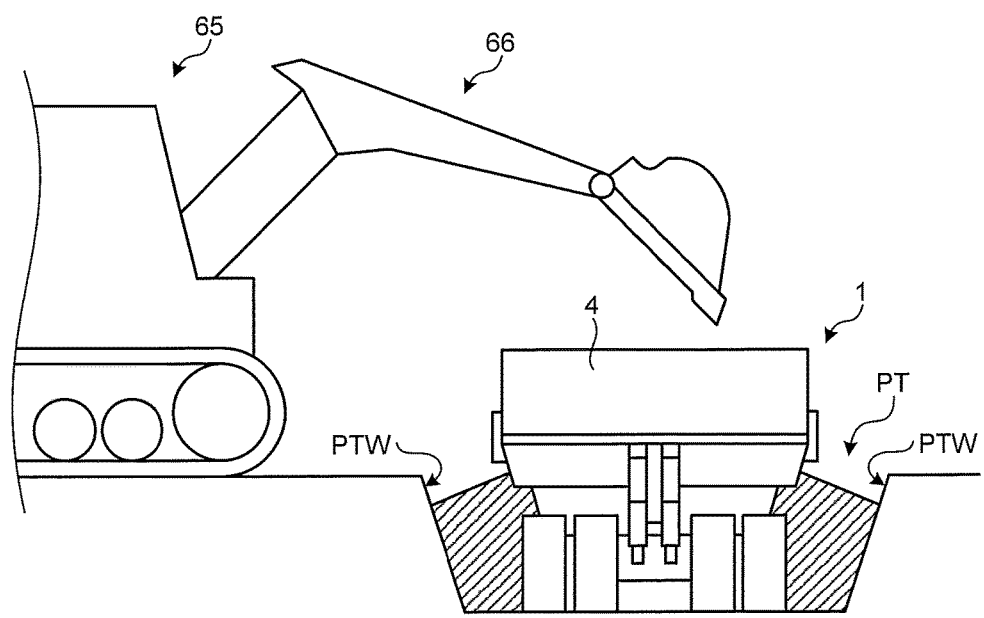
FIG. 15 is a diagram illustrating a state where a load is loaded from a loading machine 65 onto a vessel 4 of the dump truck 1.

FIG. 15 is a diagram illustrating a state where the load is loaded from a loading machine 65 onto the vessel 4 of the dump truck 1. The dump truck 1 loads the load onto the vessel 4 by a working unit 66 of the loading machine 65 such as an excavator at a loading station PT. In FIG. 15, the excavator is illustrated as the loading machine 65, but a wheel loader may be operated as the loading machine 65. As illustrated in FIG. 15, the loading station PT may be excavated from the ground surface where the loading machine 65 is operated. For this reason, when the dump truck 1 stops at the loading station PT, the wall surfaces PTW of the loading station PT are positioned at both left and right sides thereof. Further, the loading station is not limited to the type of the loading station PT illustrated in FIG. 15. For example, the loading machine 65 which is operated at a position higher than the dump truck 1 may load the load onto the vessel 4 of the dump truck 1 which stops at the lower position. In this case, since the ground surface where the loading machine 65 is operated is higher than the ground surface where the dump truck 1 stops, a wall surface or a slope caused by the excavation exists at the side surface near the loading machine 65 of the dump truck 1.

As illustrated in FIG. 13, the radar devices 23, 24, 27, and 28 detect the object existing at the lateral side of the dump truck 1. For this reason, when the dump truck 1 enters the loading station PT, the radar devices 23, 24, 27, and 28 detect the wall surface PTW. As a result, the alarm control unit 150 which is included in the controller 100 illustrated in FIG. 3 notifies the alarm based on the detection result of the radar devices 23, 24, 27, and 28. Even when the loading station PT is not excavated, the loading machine 65 is operated around the dump truck 1. For this reason, there is an extremely high possibility that the radar devices 21 to 28 of the periphery monitoring system 10 may detect the loading machine 65. When the radar devices 21 to 28 detect the loading machine 65, the alarm control unit 150 notifies the alarm based on the detection result of the radar devices 21 to 28.

In a case where the loading station PT is excavated, the controller 100 keeps notifying the alarm until the dump truck 1 moves out from the loading station PT, that is, unless the dump truck 1 moves to a place where the wall surface PTW is not detected by the radar devices 23, 24, 27, and 28. Further, even in a case where the loading station PT is not excavated, the radar devices 21 to 28 detect the loading machine 65 which is operated around the dump truck 1, there is a high possibility that the controller 100 keeps notifying the alarm until the load loading operation ends and the dump truck 1 moves away from the loading machine 65. Alternatively, there is a high possibility that the alarm is continuously notified until the load loading operation ends and the loading machine 65 moves away from the dump truck 1.

In this way, when the controller 100 keeps notifying the alarm during the load loading operation, there is a possibility that the operator of the dump truck 1 may feel troublesome. Particularly when the alarm sound is notified, the operator feels more troublesome. When the operator feels troublesome due to the continuous notification of the alarm, there is a possibility that the operator may turn off the periphery monitoring system 10 so that the system is not operated. Further, when the operator turns off the periphery monitoring system 10, there is a need to turn on the periphery monitoring system 10 when the system needs to be operated later, and hence the power manipulation operation is troublesome. Alternatively, in a case where the operator turns off the periphery monitoring system 10, when the operator changes the place with another operator, the changed operator needs to check whether the periphery monitoring system 10 is turned on or carry out a troublesome operation of turning on the periphery monitoring system.

In order to prevent such troublesome operations, the periphery monitoring system 10 illustrated in FIG. 3, and more specifically, the controller 100 executes the load loading alarm control and selects a notification mode or a restriction mode in response to the state of the dump truck 1. As the state of the dump truck 1, a state may be exemplified in which a load is loaded from the loading machine 65 onto the dump truck 1. Accordingly, the controller 100 selects the notification mode or the restriction mode based on the state where the load is loaded from the loading machine 65 onto the dump truck 1. Next, a procedure in which the controller 100 executes the load loading alarm control will be described.

Figure 16:
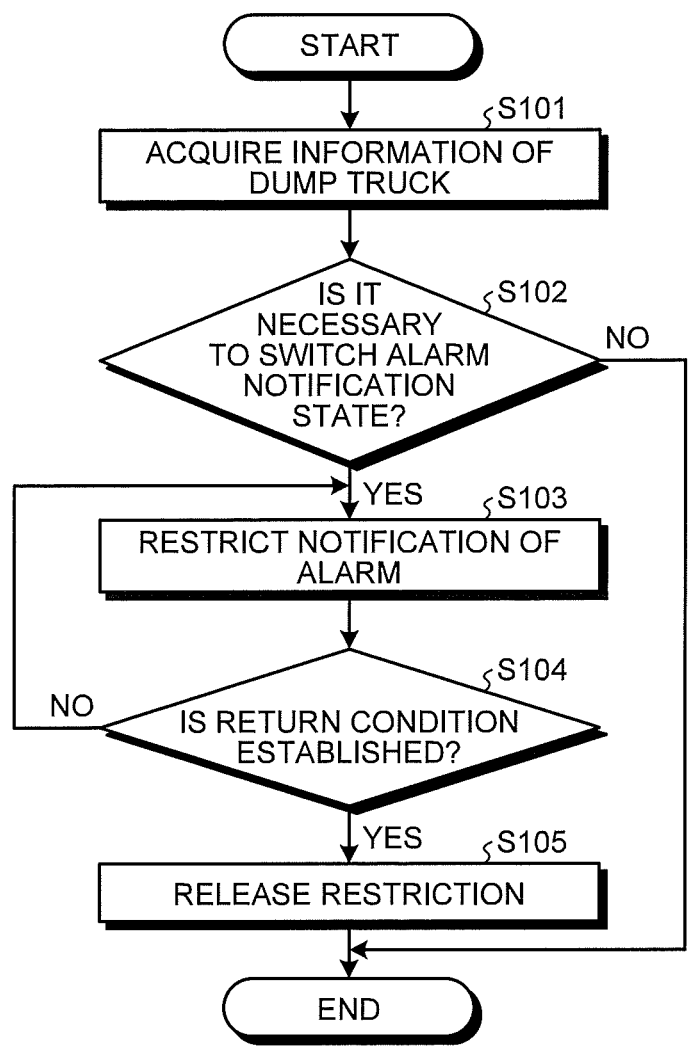
FIG. 16 is a flowchart illustrating a procedure in which the controller 100 executes load loading alarm control.

FIG. 16 is a flowchart illustrating a procedure of the load loading alarm control which is executed by the controller 100. The periphery monitoring system 10 is normally in the notification mode. That is, when the radar devices 21 to 28 detect the object around the dump truck 1, the controller 100 selects a mode for notifying the alarm. When executing the load loading alarm control, in step S101, the alarm control unit 150 of the controller 100 illustrated in FIG. 3 acquires the information of the dump truck 1. The information is information (hereinafter, appropriately referred to as the vehicle state information) on the state of the dump truck 1, and the alarm control unit 150 may acquire the information from, for example, the control device of the dump truck 1 through a communication line provided in the vehicle.

Next, the routine proceeds to step S102, and the alarm control unit 150 determines whether there is a need to change the alarm notification mode based on the vehicle state information acquired in step S101. In the embodiment, it is possible to determine whether the alarm notification mode needs to be switched based on, for example, the state where the load is loaded on the vessel 4. For example, when the brake of the dump truck 1, that is, the parking brake in the embodiment is operated (a parking mode), the wheel lock brake of the dump truck 1 is operated (a wheel lock mode), or the foot brake of the dump truck 1 is operated, it is possible to expect that a load will be loaded onto the vessel 4. This is because there is a high possibility that the load may be loaded when any one of various brakes is operated. Accordingly, it is possible to improve the accuracy for determining whether to switch the alarm notification mode by using such a state (the vehicle state information). Furthermore, since the vessel 4 is in the loading posture when loading the load thereon, it is desirable to determine whether to switch the alarm notification mode when the vessel 4 is in the loading posture in addition to the case where the parking brake is operated. The state where the vessel 4 is in the loading posture may be detected by the vessel sitting sensor 43 illustrated in FIG. 3. That is, when the vessel sitting sensor 43 detects the sitting of the vessel 4, the vessel 4 is in the loading posture.

The parking brake is operated when the shift lever 37 illustrated in FIGS. 2 and 3 is set as the parking position or the parking brake operation switch 37P illustrated in FIG. 3 is turned on. The parking brake applies the braking force only to the rear wheel 6 by using a spring. Since it is the spring force, the braking force is weaker than that of the hydraulic brake. The alarm control unit 150 may detect whether the parking brake is operated by acquiring the position information of the shift lever 37 detected by the shift lever position sensor 37S or the information of detecting the operation of the parking brake operation switch 37P.

In many cases, the wheel lock brake is generally used for a so-called electric dump in which the dump truck 1 drives a motor by receiving power from a line and runs by the driving force or drives a generator by an engine, drives a motor by the generated power, and runs by the driving force. The wheel lock brake generates an electric signal by an operation of a wheel lock switch (not illustrated), operates a hydraulic valve, and applies the braking force obtained the hydraulic brake only to the rear wheel 6. The alarm control unit 150 may detect whether the wheel lock brake is operated by acquiring the information on the operation of the wheel lock switch.

The foot brake is operated when the operator of the dump truck 1 steps on the brake pedal 35Bf or the secondary brake pedal 35Bs illustrated in FIG. 2. When the foot brake is operated, the braking force obtained by the hydraulic brake acts on both the front wheel 5 and the rear wheel 6 of the dump truck 1. Accordingly, the foot brake is not operated when the engine of the dump truck 1 is not operated. The alarm control unit 150 may detect whether the foot brake is operated by acquiring the information on whether the brake pedal 35Bf or the secondary brake pedal 35Bs is operated.

When a load is loaded on the dump truck 1, any one of the parking brake, the wheel lock brake, and the foot brake is used in accordance with the operation of the operator of the dump truck 1. The braking force is the largest in the case of the foot brake, but since the braking force is applied to all wheels, there is a tendency that the burden acting on the frame 2f increases during the load loading operation. For this reason, in a case where the dump truck 1 includes the wheel lock brake, it is desirable to use the wheel lock brake which applies the braking force obtained by the hydraulic brake only to the rear wheel 6 during the load loading operation. Accordingly, in a case where the wheel lock brake is operated, there is a high possibility that the load is loaded.

Further, it is possible to determine whether a load is loaded on the vessel 4 based on, for example, the current position of the dump truck 1. For example, a position detecting device called a GPS (Global Positioning System) sensor is mounted on the dump truck 1 and the position information (the geometric information) indicating the position of the loading station PT is stored in the storage unit 160 of the controller 100 in advance. Then, when it is determined that the current position of the dump truck 1 detected by the GPS sensor is equal to the position indicated by the position information indicating the position of the loading station PT, the alarm control unit 150 may switch the alarm notification mode by determining that the load will be loaded on the vessel 4 from now on. When the current position of the dump truck 1 is the loading station PT, there is a high possibility that the load will be loaded from now on. Accordingly, it is possible to improve the accuracy for determining whether to switch the alarm notification mode by using the position information indicating the position of the loading station PT. Furthermore, the position information indicating an arbitrary position may be stored in the storage unit 160 in advance in addition to the position information indicating the position of the loading station PT stored in the storage unit 160.

Further, it is possible to determine whether a load is loaded on the vessel 4 based on a loading start signal transmitted from the loading machine 65 and starting an operation of loading a load onto the vessel 4 of the dump truck 1. In this case, for example, the alarm control unit 150 acquires the loading start signal by the wireless transmission between the loading machine 65 and the dump truck 1. As the alarm start signal, an electric signal which is generated when the operator of the loading machine 65 operates a predetermined operation button provided around the driver seat may be converted into a wireless communication signal and may be transmitted to the dump truck 1. In addition, as the alarm start signal, the alarm start signal may be generated when the operator of the loading machine 65 operates an operation button for ringing a horn provided in the loading machine 65, the generated alarm start signal may be converted into a wireless communication signal, and the signal may be transmitted to the dump truck 1. When the dump truck 1 acquires the loading start signal, the alarm control unit 150 determines that the alarm notification mode may be switched by determining that a load will be loaded on the vessel 4 from now on. It is possible to determine whether a load is loaded on the vessel 4 by the combination of at least two of the operation of the brake of the dump truck 1, the sitting state of the vessel 4, the current position of the dump truck 1, and the loading start signal.

In step S102, for example, when the alarm notification mode needs to be switched since the parking brake is operated (Yes in step S102), the alarm control unit 150 proceeds to the process in step S103. Further, when the alarm notification mode does not need to be switched since the parking brake is not operated (No in step S102), the alarm control unit 150 ends the load loading alarm control while maintaining the notification mode.

In step S103, the alarm control unit 150 restricts the notification of the alarm. That is, the alarm control unit 150 switches the notification mode to the restriction mode. In the embodiment, the notification of the alarm using at least a sound is stopped in the restriction mode. In this way, the trouble caused by the continuous notification of the alarm is reduced. In the embodiment, the alarm using at least a sound may be stopped in the restriction mode. In addition, the alarm control unit 150 may stop at least one of the display of the mark on the monitor 50 and the highlighted display of the alarm regions C11 to C16 illustrated in FIG. 14. In this way, the trouble caused by the continuous notification of the alarm is reduced.

Furthermore, in the restriction mode, the alarm control unit 150 may stop the notification of the alarm using a sound and display an alarm image on the monitor 50. In this way, the operator of the dump truck 1 may check the peripheral environment of the dump truck 1 on the screen of the monitor 50. Particularly when a vehicle other than the loading machine 65 approaches the dump truck 1, since the moving mark is displayed on at least the monitor 50, the operator may check the approach of the vehicle. As the alarm image, the mark or the highlighted alarm regions C11 to C16 is displayed.

Further, in the restriction mode, the alarm control unit 150 may decrease the alarm sound to a predetermined level of volume instead of stopping the notification of the alarm using the alarm sound. In this way, even when the notification of the sound is continued, the trouble may be reduced by adjusting the sound to a predetermined level of volume in which the operator does not feel noisy.

In the restriction mode, the alarm control unit 150 may set the restriction mode by stopping the operation of the radar devices 21 to 28 and stopping the notification of the alarm corresponding to the detection subject of the radar devices 21 to 28. In order to stop the operation the radar devices 21 to 28, for example, a method may be employed in which the power supply to the radar devices 21 to 28 is stopped, that is, the radar devices 21 to 28 are turned off. Further, the alarm control unit 150 may set the restriction mode by stopping the notification of the alarm corresponding to the detection subject of the radar devices 21 to 28 as the state where the detection result of the radar devices 21 to 28 is not input to the controller 100.

Further, the alarm control unit 150 may set the restriction mode without executing the notification of the alarm even when the detection result of the radar devices 21 to 28 is input to the controller 100. Specifically, the alarm control unit 150 sets the restriction mode without ringing the alarm sound, highlighting the alarm regions C11 to C16 corresponding to the detection ranges of the radar devices 21 to 28 and illustrated in FIG. 14, and displaying the mark. In these methods, the restriction mode may be realized in accordance with any method.

In a case where the operation of the radar devices 21 to 28 is stopped, since the radar devices 21 to 28 does not output the detection result, the detection result is input to the controller 100. Meanwhile, in a case where the detection result of the radar devices 21 to 28 is not input to the controller 100, the radar devices 21 to 28 output the detection result when detecting the object, but the controller 100 does not receive the input. Alternatively, in a case where the alarm control unit 150 does not execute the notification of the alarm, the controller 100 receives the detection result when the radar devices 21 to 28 detect the object.

When the notification mode is switched to the restriction mode, the routine proceeds to step S104, and the alarm control unit 150 determines whether the return condition is established. It is possible to determine whether the return condition is established based on whether the load is completely loaded on the vessel 4. For example, in a case where the parking brake of the dump truck 1 is released, the wheel lock brake of the dump truck 1 is released, or the foot brake of the dump truck 1 is released, it is determined that the load is completely loaded on the vessel 4 and the return condition is established.

Further, when the weight (the loading amount) of the load of the vessel 4 detected by the payload control device 40 becomes a predetermined threshold value or more, it may be determined that the load is completely loaded on the vessel 4 and the return condition is established. Further, the determination may be made based on the loading end signal transmitted from the loading machine 65 and indicating the state where the load is completely loaded on the vessel 4 of the dump truck 1. In this case, for example, the alarm control unit 150 acquires a loading end signal by the wireless communication between the loading machine 65 and the dump truck 1. When the loading end signal is acquired, the alarm control unit 150 may determine that the load is completely loaded on the vessel 4 and the return condition is established. Furthermore, as in the example of the loading start signal, the loading end signal may be generated when the operator of the loading machine 65 operates a predetermined operation button or a button for ringing a horn.

When the dump truck 1 starts to run or the current position of the dump truck 1 moves away from the loading station PT, it may be determined that the load is completely loaded on the vessel 4 and the return condition is established. However, the periphery monitoring system 10 assists the operator to check the peripheral environment of the dump truck 1 before starting the dump truck 1. Accordingly, it is desirable to determine the establishment of the return condition before the dump truck 1 starts to run.

When the return condition is not established (No in step S104), the alarm control unit 150 repeats the processes in step S103 and step S104. When the return condition is established (Yes in step S104), the routine proceeds to step S105, and the alarm control unit 150 releases the stop of the alarm by releasing the restriction in a manner such that the restriction mode is switched to the notification mode. In a case where both the alarm sound and the display of the alarm image on the monitor 50 are stopped in the restriction mode, when the return condition is established before the dump truck 1 starts to run, only the notification of the alarm sound is stopped, and the alarm image, for example, at least one of the mark and the image of highlighting the alarm regions C11 to C16 is displayed on the monitor 50, thereby notifying the alarm by the image. In this way, it is possible to prevent the trouble of the operator of the dump truck 1 caused by the continuation of the alarm sound and to check the object existing around the dump truck 1 on the screen of the monitor 50.

As described above, the periphery monitoring system 10 selects the notification mode or the restriction mode in response to the state of the dump truck 1. In this way, since the notification of the alarm is restricted when a load is loaded onto the dump truck 1 during the loading operation, even when the radar devices 21 to 28 detect the loading machine 65 existing around the dump truck 1, the wall surface PTW forming the ground of the loading station PT, the slope formed by the excavation, or the other wall surface, the continuous notification of the alarm may be prevented. Alternatively, when a load is loaded onto the dump truck 1 during the loading operation, the alarm is made not to be notified by preventing the radar devices from detecting the loading machine 65 existing around the dump truck 1, the wall surface PTW forming the ground of the loading station PT, the slope formed by the excavation, or the other wall surface. As a result, it is possible to reduce the possibility in which the operator of the dump truck 1 feels troublesome when loading a load onto the vessel 4 during the loading operation. Accordingly, it is possible to keep monitoring the periphery of the dump truck 1 using the periphery monitoring system 10 by reducing the possibility of stopping the operation of the periphery monitoring system 10 by the operator who feels troublesome about the continuous notification of the alarm.

While the embodiment has been described, the embodiment is not limited to the above-described content. Further, the constituents that are described above include a constituent that is easily supposed by the person skilled in the art, a constituent that has substantially the same configuration, and a constituent that is included in a so-called equivalent scope. Further, the above-described constituents may be appropriately combined with each other. Furthermore, the constituents may be omitted, replaced, or modified in various forms in the scope without departing from the spirit of the embodiment.

REFERENCE SIGNS LIST

1 dump truck
2 vehicle body portion
3 cab
4 vessel
4F flange portion
10 work vehicle periphery monitoring system (periphery monitoring system)
11 to 16 image capturing device
21 to 28 radar device
31 driver seat
37 shift lever
37S shift lever position sensor
37P parking brake operation switch
38 dump lever
38S dump lever position sensor
40 payload control device
41 pressure sensor
43 vessel sitting sensor
50 monitor
65 loading machine
100 controller
110 bird's eye image synthesizing unit
120 camera image switching/viewing point changing unit
130 object position information generating unit
140 display control unit
160 storage unit
150 alarm control unit
200 bird's eye image
210 object information collecting unit
220 object processing unit

The invention claimed is:

1. A dump truck periphery monitoring system which monitors a periphery of a dump truck, the dump truck periphery monitoring system comprising:
   a plurality of radar devices each of which is attached to the dump truck and detects an object existing around the dump truck, the dump truck being with a vessel having an upper opening for loading a load thereon in a loading station, the load being loaded from above by a loading machine onto the vessel; and
   a controller which notifies a driver of an alarm by generating an alarm sound or displaying a mark on a monitor when the radar device detects the loading machine, a wall surface of the loading station, a slope of the loading station or an other wall around the vessel of the dump truck and switches between a notification mode notifying the driver of the alarm and a restriction mode prohibiting the notification of the alarm to the driver,
wherein the controller selects the restriction mode when a shift lever is set as a parking position, or a parking brake is operated,
when the shift lever of the dump truck in the loading station is set as the parking position, or the parking brake of the dump truck in the loading station is operated, the controller automatically selects the restriction mode, and when the shift lever of the dump truck in the loading station is set as a position other than the parking position, or the parking brake of the dump truck in the loading station is released, the controller automatically switches to the notification mode regardless of a speed of the dump truck even when the speed of the dump truck is zero.

2. The dump truck periphery monitoring system according to claim 1, wherein the dump truck further includes a vessel sitting sensor which detects a sitting of the vessel, and the controller sets the restriction mode when the vessel sitting sensor detects the sitting of the vessel.

3. The dump truck periphery monitoring system according to claim 1, wherein the controller stops the notification of the alarm using at least a sound in the restriction mode.

4. The dump truck periphery monitoring system according to claim 3, wherein the controller displays an alarm image on a display device.

5. The dump truck periphery monitoring system according to claim 1, wherein the controller stops an operation of the object detecting device to set the restriction mode.

6. The dump truck periphery monitoring system according to claim 1, wherein the controller causes the detection result of the object detecting device not to be input to set the restriction mode.

7. The dump truck periphery monitoring system according to claim 1,
wherein the controller sets the restriction mode when receiving a loading start signal transmitted from a loading machine which loads the load on the vessel, and
wherein the controller sets the notification mode when receiving a loading end signal transmitted from the loading machine.

8. The dump truck periphery monitoring system according to claim 1, wherein the controller switches the restriction mode to the notification mode when a brake of the dump truck is released in the restriction mode.

9. A dump truck periphery monitoring system which monitors a periphery of a dump truck, the dump truck periphery monitoring system comprising:
a plurality of radar devices each of which is attached to the dump truck and detects an object existing around the dump truck, the dump truck being with a vessel having an upper opening for loading a load thereon in a loading station, the load being loaded from above by a loading machine onto the vessel; and
a controller which notifies a driver of an alarm when the radar device detects the loading machine, a wall surface of the loading station, a slope of the loading station or an other wall around the vessel of the dump truck and a shift lever is not set as a parking position and a parking brake is not operated, and restricts the notification of the alarm to the driver when the radar device detects the object around the dump truck and the shift lever is set as the parking position or the parking brake is operate,
when the shift lever of the dump truck in the loading station is set as the parking position, or the parking brake of the dump truck in the loading station is operated, the controller automatically selects the restriction mode, and when the shift lever of the dump truck in the loading station is set as a position other than the parking position, or the parking brake of the dump truck in the loading station is released, the controller automatically switches to the notification mode regardless of a speed of the dump truck even when the speed of the dump truck is zero.

10. A dump truck periphery monitoring system which monitors a periphery of a dump truck, the dump truck periphery monitoring system comprising:
a plurality of radar devices each of which is attached to the dump truck and detects an object existing around the dump truck, the dump truck being with a vessel having an upper opening for loading a load thereon in a loading station, the load being loaded from above by a loading machine onto the vessel;
a position detecting device which detects a position of the dump truck;
a storage unit which stores position information of the loading station in advance; and
a controller which notifies a driver of an alarm when the radar device detects the loading machine, a wall surface of the loading station, a slope of the loading station or an other wall around the vessel of the dump truck and a current position of the dump truck detected by the position detecting device is not within the loading station, and restricts the notification of the alarm to the driver when the radar device detects the object around the dump truck and the current position of the dump truck detected by the position detecting device is within the loading station,
when the shift lever of the dump truck in the loading station is set as the parking position, or the parking brake of the dump truck in the loading station is operated, the controller automatically selects the restriction mode, and when the shift lever of the dump truck in the loading station is set as a position other than the parking position, or the parking brake of the dump truck in the loading station is released, the controller automatically switches to the notification mode regardless of a speed of the dump truck even when the speed of the dump truck is zero.

11. A dump truck periphery monitoring system which monitors a periphery of a dump truck, the dump truck periphery monitoring system comprising:
a plurality of radar devices each of which is attached to the dump truck and detects an object existing around the dump truck, the dump truck being with a vessel having an upper opening for loading a load thereon in a loading station, the load being loaded from above by a loading machine onto the vessel;
a position detecting device which detects a position of the dump truck; and
a controller which notifies an alarm when the radar device detects the loading machine, a wall surface of the loading station, a slope of the loading station or an other wall around the vessel of the dump truck and switches between a notification mode notifying a driver the alarm and a restriction mode prohibiting the notification of the alarm,
wherein the controller includes a storage unit which stores position information of the loading station, and wherein the controller selects the restriction mode when a current position detected by the position detecting device is within the loading station, when the shift lever of the dump truck in the loading station is set as the parking position, or the parking brake of the dump truck in the loading station is operated, the controller automatically selects the restriction mode, and when the shift lever of the dump truck in the loading station is set as a position other than the parking position, or the parking brake of the dump truck in the loading station is released, the controller automatically switches to the notification mode regardless of a speed of the dump truck even when the speed of the dump truck is zero.

12. The work vehicle periphery monitoring system according to claim 1, wherein in the notification mode, both the alarm sound and the display of the mark on the monitor are used, and in the restriction mode, only the display of the mark on the monitor is used and the alarm sound is restricted.

* * * * *